United States Patent
James et al.

(10) Patent No.: US 10,410,188 B2
(45) Date of Patent: Sep. 10, 2019

(54) ELECTRONIC CHECK SPLITTING SYSTEM, METHOD AND APPARATUS

(71) Applicant: NTN Buzztime, Inc., Carlsbad, CA (US)

(72) Inventors: LaShawn James, Carlsbad, CA (US); Atsuko Ueno, San Marcos, CA (US)

(73) Assignee: NTN Buzztime, Inc., Carlsbad, CA (US)

( * ) Notice: Subject to any disclaimer, the term of this patent is extended or adjusted under 35 U.S.C. 154(b) by 510 days.

(21) Appl. No.: 14/645,265

(22) Filed: Mar. 11, 2015

(65) Prior Publication Data

US 2016/0267448 A1 Sep. 15, 2016

(51) Int. Cl.
G06Q 30/04 (2012.01)
G06Q 20/10 (2012.01)
G06Q 50/12 (2012.01)
G06Q 20/22 (2012.01)

(52) U.S. Cl.
CPC .......... G06Q 20/102 (2013.01); G06Q 20/29 (2013.01); G06Q 50/12 (2013.01)

(58) Field of Classification Search
CPC ........ G06Q 40/00; G06Q 50/12; G06Q 30/00; G06F 17/30
USPC .................. 705/5, 30, 26.7, 32, 40
See application file for complete search history.

(56) References Cited

U.S. PATENT DOCUMENTS

| | | | | |
|---|---|---|---|---|
| 7,457,767 B1* | 11/2008 | Dunsmore | ........... | G06Q 20/102 235/380 |
| 7,577,610 B2* | 8/2009 | Miyuki | ................ | G06Q 20/102 705/15 |
| 8,306,860 B2* | 11/2012 | Dunsmore | ........... | G06Q 20/102 705/15 |
| 8,306,861 B2* | 11/2012 | Dunsmore | ........... | G06Q 20/102 705/15 |
| 8,583,933 B2* | 11/2013 | Granbery | .............. | H04L 9/3247 705/5 |
| 8,898,075 B2* | 11/2014 | Khuchua-Edelman | ...................... G06Q 30/0633 | 235/379 |
| 8,984,290 B2* | 3/2015 | Granbery | .............. | H04L 9/3247 705/5 |
| 9,031,867 B1* | 5/2015 | Crawford | ........... | G06Q 30/0601 705/15 |
| 9,375,067 B2* | 6/2016 | Inukai | ....................... | G06G 1/14 |
| 9,633,383 B2* | 4/2017 | Zamer | .................... | G06Q 30/04 |
| 2002/0101626 A1* | 8/2002 | Pandipati | ............... | G06Q 40/00 358/505 |
| 2003/0078793 A1* | 4/2003 | Toth | ....................... | G06Q 30/02 705/15 |
| 2006/0186197 A1* | 8/2006 | Rosenberg | ............. | G06Q 30/00 235/380 |
| 2006/0229984 A1* | 10/2006 | Miyuki | ................ | G06Q 20/102 705/40 |

(Continued)

Primary Examiner — Oluseye Iwarere
(74) Attorney, Agent, or Firm — Thibault Patent Group

(57) ABSTRACT

Methods and apparatus for splitting an electronically-generated check among several people. A group of people may order goods or services using a customer device associated with each customer. The orders are sent to a point-of-sale server which creates a combined accounting of the orders of a group of people. When the group is ready to check out, they may apportion items from the combined accounting to simulated checks displayed on each of the customer devices. Then, each person may pay their bill individually.

21 Claims, 29 Drawing Sheets

(56) References Cited

U.S. PATENT DOCUMENTS

| | | | |
|---|---|---|---|
| 2007/0061209 A1* | 3/2007 | Jackson | G06Q 30/0603 705/15 |
| 2008/0123659 A1* | 5/2008 | Rosenau | G06F 12/0246 370/395.7 |
| 2009/0039150 A1* | 2/2009 | Lay | G06Q 20/14 235/379 |
| 2009/0055276 A1* | 2/2009 | Dunsmore | G06Q 20/102 705/15 |
| 2009/0055280 A1* | 2/2009 | Dunsmore | G06Q 20/102 705/17 |
| 2012/0166332 A1* | 6/2012 | Naaman | G06Q 20/102 705/40 |
| 2012/0173396 A1* | 7/2012 | Melby | G06Q 20/102 705/34 |
| 2013/0166917 A1* | 6/2013 | Granbery | H04L 9/3247 713/179 |
| 2014/0006205 A1* | 1/2014 | Berry | G06Q 30/0641 705/26.7 |
| 2014/0074522 A1* | 3/2014 | Granbery | H04L 9/3247 705/5 |
| 2014/0074580 A1* | 3/2014 | Khuchua-Edelman | G06Q 30/0633 705/14.27 |
| 2014/0114776 A1* | 4/2014 | Solanki | G06Q 30/06 705/15 |
| 2014/0156517 A1* | 6/2014 | Argue | G07G 1/0081 705/40 |
| 2014/0164152 A1* | 6/2014 | Inukai | G06G 1/14 705/15 |
| 2014/0164234 A1* | 6/2014 | Coffman | G06Q 20/14 705/40 |
| 2014/0279098 A1* | 9/2014 | Ham | G06Q 20/102 705/16 |
| 2015/0095168 A1* | 4/2015 | Zises | G06Q 30/0623 705/15 |
| 2015/0149307 A1* | 5/2015 | Thukral | G06Q 30/0635 705/15 |
| 2015/0154518 A1* | 6/2015 | Granbery | H04L 9/3247 705/51 |
| 2015/0302384 A1* | 10/2015 | Aadi | G06Q 20/29 705/40 |
| 2015/0310408 A1* | 10/2015 | Anderson | G06Q 20/14 705/39 |
| 2015/0339318 A1* | 11/2015 | O'Toole | G06Q 20/29 705/40 |
| 2015/0348144 A1* | 12/2015 | Zamer | G06Q 30/04 705/40 |
| 2016/0260070 A1* | 9/2016 | Timchuk | G06Q 20/20 |
| 2016/0267448 A1* | 9/2016 | James | G06Q 20/102 |
| 2017/0109793 A1* | 4/2017 | Berry | G06Q 30/0268 |

* cited by examiner

| ← Back | PAY CHECK | | | Pay Now |
|---|---|---|---|---|
| ADD ITEMS TO THE CHECK | CHECK DETAILS | | | ‹ Split single item evenly |
| | Category 1 | | | |
| 800 — GUEST 1 $00.00 | ROMAN STYLE BURGER | x2 | $6.95 ea | $13.90 |
| 802 — GUEST 2 $00.00 | DIET COKE | x3 | $1.95 ea | $5.85 |
| 804 — GUEST 3 $00.00 | SMOKEY BURGER | x1 | $8.95 ea | $8.95 |
| | CHAMPAGNE | x1 | $95.00 ea | $95.00 |
| | FRENCH FRIES | x3 | $4.95 ea | $14.85 |
| | | | Subtotal: $138.55 | |
| | | | Tax: $11.10 | |
| | TABLE: 14 | BALANCE REMAINING $149.65 | | |
| X Exit | Pay Check | | My Account | |

FIG. 8

| | | PAY CHECK | Pay Now |
|---|---|---|---|
| ← Back | | | |

| ADD ITEMS TO THE CHECK | CHECK DETAILS | ⊀ Split single item evenly |
|---|---|---|

Category 1

800 — GUEST 1    $00.00         ROMAN STYLE BURGER   x2   $6.95 ea   $13.90
802 — GUEST 2                    DIET COKE            x3   $1.95ea    $5.85
         SMOKEY BURGER   x1   $8.95 ea   $8.95
804 — GUEST 3    $00.00                               x1   $8.95 ea   $8.95
                                 CHAMPAGNE            x1   $95.00 ea  $95.00
                                 FRENCH FRIES         x3   $4.95 ea   $14.85

TABLE: 14    BALANCE REMAINING $149.65

X Exit                Pay Check       My Account

FIG. 9

| | | PAY CHECK | Pay Now |
|---|---|---|---|
| ← Back | | | |

| ADD ITEMS TO THE CHECK | | CHECK DETAILS | ⊣ Split single item evenly |
|---|---|---|---|

800 — GUEST 1 — $00.00
802 — GUEST 2 — $9.67
804 — GUEST 3 — $00.00
          802

CHECK DETAILS
Category 1
ROMAN STYLE BURGER   x2   $6.95 ea   $13.90
DIET COKE                       x3   $1.95ea    $5.85
SMOKEY BURGER           x1   $8.95 ea   $0.00
CHAMPAGNE                  x1   $95.00 ea  $95.00
FRENCH FRIES                x3   $4.95 ea   $14.85

Subtotal: $129.60
Tax: $10.37

TABLE: 14    BALANCE REMAINING $139.97

X Exit        Pay Check    My Account

| ← Back | PAY CHECK | | | Pay Now |
|---|---|---|---|---|
| ADD ITEMS TO THE CHECK | Split Single Item Evenly | | | Done |
| | Category 1 | | | |
| 800 — GUEST 1 $00.00 | ROMAN STYLE BURGER | x2 | $6.95 ea | |
| 802 — GUEST 2 $00.00 | DIET COKE | x3 | $1.95ea | $5.85 |
| 804 — GUEST 3 $00.00 | SMOKEY BURGER | x1 | $8.95 ea | $8.95 |
| | CHAMPAGNE | x1 | $95.00 ea | $95.00 |
| | FRENCH FRIES | x3 | $4.95 ea | $14.85 |
| | | | Subtotal: | $138.55 |
| | | | Tax: | $11.10 |
| | TABLE: 14 | BALANCE REMAINING | | $149.65 |
| X Exit | Pay Check | | My Account | |

FIG. 12

|  | ← Back | PAY CHECK | | | Pay Now |
|---|---|---|---|---|---|
|  | ADD ITEMS TO THE CHECK | CHECK DETAILS | | ◁ Split single item evenly | |
|  |  | Category 1 | | | |
| 800 | GUEST 1 — $34.20 | ROMAN STYLE BURGER | x2 | $6.95 ea | $13.90 |
| 802 | GUEST 2 — $34.20 | DIET COKE | x3 | $1.95ea | $5.85 |
| 804 | GUEST 3 — $34.20 | SMOKEY BURGER | x1 | $8.95 ea | $8.95 |
|  |  | ◁ CHAMPAGNE | x1 | $95.00 ea | $0.00 |
|  |  | FRENCH FRIES | x3 | $4.95 ea | $14.85 |
|  |  | | | Subtotal: | $43.55 |
|  |  | | | Tax: | $3.48 |
|  |  | TABLE: 14 | BALANCE REMAINING | | $47.03 |
|  | X Exit | Pay Check | My Account | | |

| ← Back | PAY CHECK | | | Pay Now | |
|---|---|---|---|---|---|
| ADD ITEMS TO THE CHECK | CHECK DETAILS | | | ⊰ Split single item evenly | |
| | Category 1 | | | | |
| GUEST 1      X CLOSE | ROMAN STYLE BURGER | x2 | $6.95 ea | $13.90 | |
| ROMAN STYLE BURGER   SMOKEY BURGER   x00   $000.00 | | x3 | $1.95ea | $5.85 | |
| SMOKEY BURGER    x00   $000.00 | SMOKEY BURGER | x1 | $8.95 ea | $8.95 | |
| SPRING ROLL    x00   $000.00 | SPRING ROLL | x1 | $5.00 ea | $5.00 | |
| | FRENCH FRIES | x3 | $4.95 ea | $14.85 | |
| | CHICKEN SALAD | x1 | $6.95ea | $6.95 | |
| ⊘ DELETE THIS CHECK    SUBTOTAL $000.00 | BEER | x2 | $6.00ea | $6.00 | |
| | TABLE: 14    BALANCE REMAINING   $61.50 | | | | |
| X Exit | | Pay Check | | My Account | |

FIG. 17

| ← Back | PAY CHECK | | | Pay Now |
|---|---|---|---|---|
| ADD ITEMS TO THE CHECK | CHECK DETAILS | | ⟨ Split single item evenly | |
| | Category 1 | | | |
| GUEST 1    X CLOSE | ROMAN STYLE BURGER | x2 | $6.95 ea | $13.90 |
| ROMAN STYLE BURGER   x2   $13.90 | DIET COKE | x3 | $1.95ea | $5.85 |
| SPRING ROLL   x1   $6.95 | SMOKEY BURGER | x1 | $8.95 ea | $8.95 |
| | SPRING ROLL | x1 | $5.00 ea | $5.00 |
| | FRENCH FRIES | x3 | $4.95 ea | $14.85 |
| | CHICKEN SALAD | x1 | $6.95ea | $6.95 |
| ⊘ DELETE THIS CHECK   SUBTOTAL  $20.85 | BEER | x2 | $6.00ea | $6.00 |
| | TABLE: 14 | | BALANCE REMAINING | $61.50 |
| X  Exit | Pay Check    My Account | | | |

FIG. 18

| ← Back | PAY CHECK | Pay Now |
|---|---|---|

ADD ITEMS TO THE CHECK

| | GUEST 1 | $00.00 |
|---|---|---|
| | GUEST 2 | $00.00 |
| | GUEST 3 | $00.00 |
| | GUEST 4 | $00.00 |
| | GUEST 5 | $00.00 |
| | GUEST 6 | $00.00 |

CHECK DETAILS — ⊣ Split single item evenly

| Category 1 | | | |
|---|---|---|---|
| ROMAN STYLE BURGER | x2 | $6.95 ea | $13.90 |
| DIET COKE | x3 | $1.95 ea | $5.85 |
| SMOKEY BURGER | x1 | $8.95 ea | $8.95 |
| SPRING ROLL | x1 | $5.00 ea | $5.00 |
| FRENCH FRIES | x3 | $4.95 ea | $14.85 |
| CHICKEN SALAD | x1 | $6.95 ea | $6.95 |
| BEER | x2 | $6.00 ea | $6.00 |
| TABLE: 14 | BALANCE REMAINING | | $61.50 |

X Exit     Pay Check     My Account

FIG. 19

| ← Back | PAY CHECK | | | Pay Now |
|---|---|---|---|---|
| ADD ITEMS TO THE CHECK | CHECK DETAILS | | ⊰ Split single item evenly | |
| | Category 1 | | | |
| GUEST 2    $00.00 | ROMAN STYLE BURGER | x2 | $6.95 ea | $13.90 |
| GUEST 3    $00.00 | DIET COKE | x3 | $1.95 ea | $5.85 |
| GUEST 4    $00.00 | SMOKEY BURGER | x1 | $8.95 ea | $8.95 |
| GUEST 5    $00.00 | SPRING ROLL | x1 | $5.00 ea | $5.00 |
| GUEST 6    $00.00 | FRENCH FRIES | x3 | $4.95 ea | $14.85 |
| | CHICKEN SALAD | x1 | $6.95 ea | $6.95 |
| | BEER | x2 | $6.00 ea | $6.00 |
| | TABLE: 14 | BALANCE REMAINING | | $61.50 |
| X Exit | Pay Check    My Account | | | 🛜 🔋 |

| PAY CHECK | | |
|---|---|---|
| SELECT A CHECK TO PAY | | |
| GUEST 1 | GUEST 2 | GUEST 3 |
| ROMAN STYLE BURGER x00 $000.00 | ROMAN STYLE BURGER x00 $000.00 | ROMAN STYLE BUR |
| SMOKEY BURGER x00 $000.00 | SMOKEY BURGER x00 $000.00 | SMOKEY BURGER |
| SPRING ROLL x00 $000.00 | SPRING ROLL x00 $000.00 | SPRING ROLL |
| | | |
| ⊘ PAID | SUBTOTAL $000.00<br>TAX % $000.00<br>SUBTOTAL $000.00 | |

X Exit     Pay Check    My Account

FIG. 26

ELECTRONIC CHECK SPLITTING SYSTEM, METHOD AND APPARATUS

BACKGROUND

I. Field of Use

The present application relates generally to the hospitality industry. More specifically, the present application relates to apparatus and methods for dividing a check between two or more persons.

II. Description of the Related Art

Electronic menus, known as E-menus or I-menus, have gained popularity over the past several years. They allow restaurants to easily modify their menus, and may attract customers due to the novelty of this relative new technology. Electronic menus are typically loaded onto portable computing devices, such as tablet computers, then distributed to customers upon arrival.

In addition to presenting menu items, electronic menus may allow customers to submit orders wirelessly to a kitchen without the use of waitpersons to take orders. They may additionally allow customers to pay for their purchases.

One problem with electronic menus is that they typically do not have a way to apportion purchased items to individuals in a group. For example, each person in a group of people sitting at a table in a restaurant may place food and drink orders via tablet computers provided to each person. However, the electronic menu system may not be capable of segregating each person's order, resulting in a single electronic "check" provided to each of the tablets at the conclusion of the meal. The group is then left to divide the check among them, which is often a difficult and confusing process, often resulting in a shortage relative to the check total.

It would be desirable to apportion purchased items to individuals in a group to avoid the problems typically associated with check splitting.

SUMMARY

The embodiments described herein relate to a system, device, and methods for creating separate checks from a single, combined accounting of items purchased by two or more people. In one embodiment, a customer device is described, comprising a memory for storing processor-executable instructions, a user interface for receiving input from a first person and for providing output to the first person, a communication interface for transmitting and receiving information to and from a server, a processor coupled to the memory, the user interface, and the communication interface, for executing the processor-executable instructions that cause the customer device to: receive the single, combined accounting from a server via the communication interface, display the single, combined accounting to the first person via the user interface, display two or more simulated checks on the display in addition to the single, combined accounting, each simulated check representing an accounting of a person who ordered at least some of the items listed on the single, combined accounting, receive input from the first person to assign a first item listed on the single, combined accounting purchased by the first person to a first simulated check of the two or more simulated checks, display the first item on the first simulated check via the user interface, receive input from the first person to assign a second item listed on the single, combined accounting purchased by a second person to a second simulated check of the two or more simulated checks, and display the second item on the second simulated check via the user interface.

In another embodiment, a server is described for creating separate checks from a single, combined accounting of items purchased by two or more people, comprising a memory for storing processor-executable instructions, the single, combined accounting representing items purchased by the two or more people, and two or more accounts assigned with the two or more people, respectively, a communication interface for transmitting and receiving information to and from a first customer device associated with a first person and a second customer device associated with a second person, a processor coupled to the memory and the communication interface, for executing the processor-executable instructions that cause the server to: create the single, combined accounting from orders received from the first customer device and the second customer device, provide the single, combined accounting to the first customer device upon receipt of a request from the first customer device for display on the first customer device, receive an indication from one of the first customer device of a number of people associated with the single combined accounting; and create two or more accounts, one for each of the number of people associated with the single, combined accounting.

In yet another embodiment, a system is described for splitting a check, comprising a first customer device configured to display a consolidated accounting to a first user, the consolidated accounting comprising descriptions and associated prices of items purchased by two or more people at a table in a restaurant, display two or more simulated checks in addition to the consolidated accounting, each simulated check representing an accounting of items ordered by each respective person at the table, receive input from the first person assigning a first item listed on the consolidated accounting to a first simulated check of the two or more simulated checks, display a price of the first item on the first simulated check, provide an indication on the consolidated accounting that the first item was assigned to the first simulated check, and transmit an indication of the assignment of the first item to the first simulated check to a server. The system further comprises a second customer device configured to display the consolidated accounting to a second user, display the two or more simulated checks in addition to the consolidated accounting, receive input from the second person assigning a second item listed on the consolidated accounting to a second simulated check of the two or more simulated checks, display a price of the second item on the second simulated check, provide an indication on the consolidated accounting that the second item was assigned to the second simulated check, and transmit an indication of the assignment of the second item to the second simulated check to the server. The system further comprises the server, configured to receive the indication of the assignment of the first item to the first simulated check from the first customer device, receive the indication of the assignment of the second item to the second simulated check from the second customer device, transmit a signal to the first customer device for the first customer device to add the price of the second item to the second simulated check, and transmit a signal to the second customer device for the second customer device to add the price of the first item to the first simulated check.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 6 is a screen shot of the customer device of FIG. 1 to determine whether split a check between or among a group of people;

FIG. 7 illustrates a customer entering a number of individual checks to be created by the check-splitting system;

FIG. 8 is a screen shot of the customer device shown in FIG. 1 displaying three blank, simulated checks in a column on the left, and a final combined accounting from a POS server, as shown in FIG. 1, on the right;

FIG. 9 illustrates moving a menu item from the final combined accounting on the right to one of the blank checks on the left in FIG. 8, using a "drag and drop" technique;

FIG. 10 illustrates the customer device of FIG. 1 after the menu item has been assigned to one of the simulated checks;

FIG. 11 is a screen shot of the customer device in FIG. 1 showing an icon for splitting a menu item evenly between or among two or more persons in a group;

FIG. 12 is a screen shot of the customer device in FIG. 1 showing a person splitting the cost of a menu item evenly among three simulated checks;

FIG. 13 is a screen shot of the customer device in FIG. 1 showing the result of splitting a menu item evenly among three simulated checks;

FIG. 14 is a screen shot of the customer device in FIG. 1 showing the three simulated checks and the combined accounting;

FIG. 15 is a screen shot of the customer device in FIG. 1 showing a detailed view of one of the simulated checks;

FIG. 16 is a screen shot of the customer device in FIG. 1 showing a detailed view of one of the simulated checks prior to deleting an item on the simulated check;

FIG. 17 is a screen shot of the customer device in FIG. 1 showing a person dragging one of the menu items on the simulated check to the combined accounting;

FIG. 18 is a screen shot of the customer device in FIG. 1 showing the detailed view of the simulated check and combined accounting after the menu item has been deleted from the simulated check;

FIG. 19 is a screen shot of the customer device in FIG. 1 showing a user about to delete one of the simulated checks shown in FIG. 8;

FIG. 21 is a screen shot of the customer device in FIG. 1 showing the simulated checks and the combined accounting after one of the simulated checks has been deleted;

FIG. 22 is a screen shot of the customer device in FIG. 1 showing three simulated checks after a person has selected a "check out" function;

FIG. 23 is a screen shot of the customer device in FIG. 1 showing a gratuity function and payment options for one of the simulated checks;

FIG. 26 is a screen shot of the customer device in FIG. 1 showing one of three simulated checks having been paid, while two other simulated checks remain unpaid.

DETAILED DESCRIPTION

The present application relates to embodiments for apportioning purchased items to individuals in a group when presented with a single accounting that has combined the purchases of the group. For example, food and beverage items on a single check from a number of people at a table in a restaurant may be apportioned, or assigned, to the persons who ordered each item in a manner that is easy, efficient, and even entertaining.

In one embodiment, a check-splitting function is provided by a single computing device, such as a smartphone or a tablet computer, operated by one member of a group. In another embodiment, a check-splitting function is provided on each of two or more associated computing devices, such as two or more tablets provided to customers seated at the same table in a restaurant. In this embodiment, a server is typically used to sync each of the computing devices together.

Figure 1:
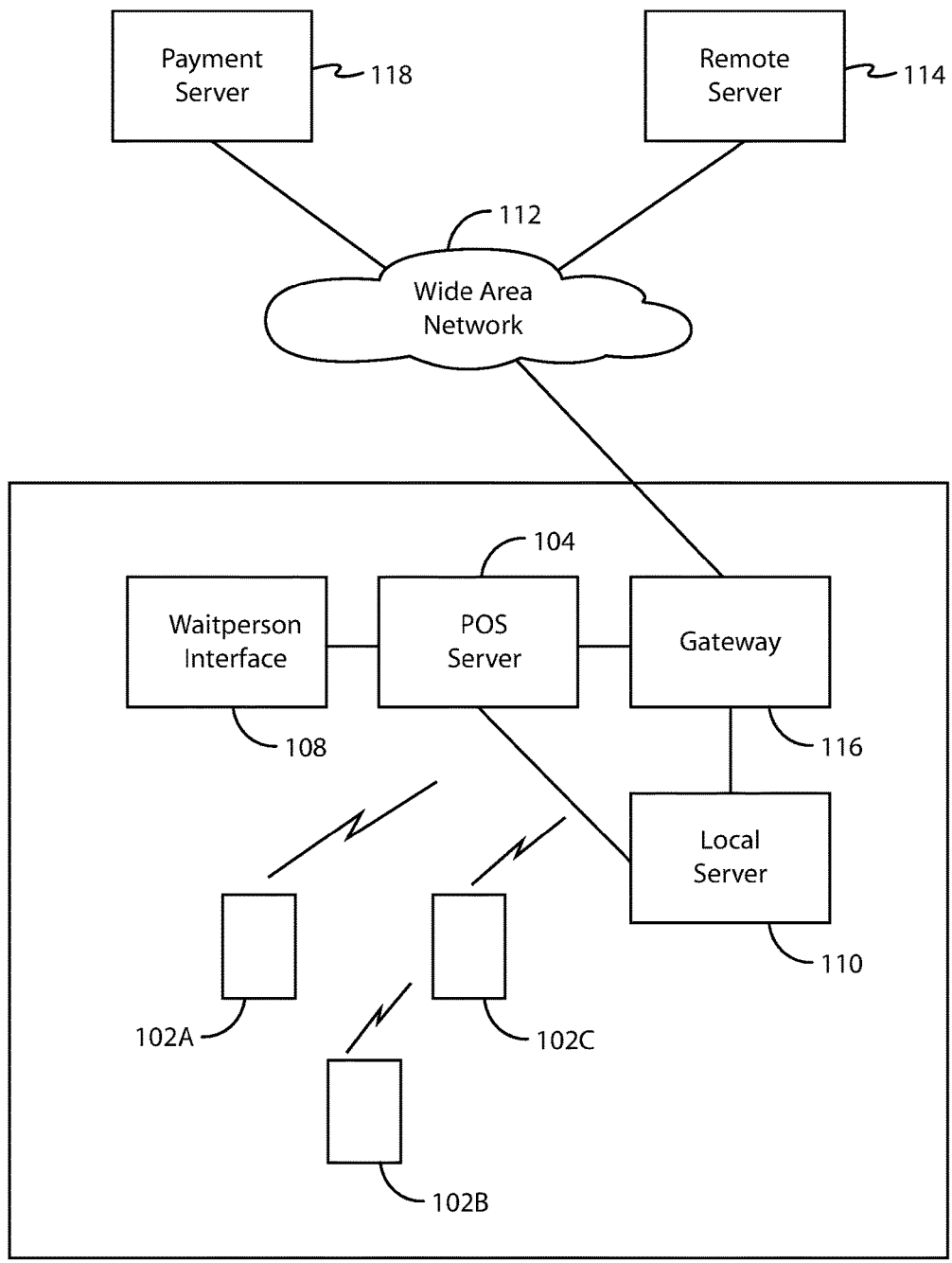
FIG. 1 illustrates one embodiment of a system for apportioning purchased items between and among a group of people in a restaurant setting.

FIG. 1 illustrates one embodiment of a system 100 for apportioning purchased items between or among a group of people in a restaurant setting. Shown are customer devices 102a, 102b, and 102c, point-of-sale (POS) server 104, kitchen interface 106, waitperson terminal 108, local server 110, wide area network 112, remote server 114, gateway 116, and payment server 118. The check splitting function may be executed by one or more of the customer devices 102, local server 110, remote server 114, or a combination of these, as described below. It should be understood that the various components of system 100 shown in FIG. 1 could be configured differently, for example, kitchen interface 106 could be coupled to POS server 104.

Each of the customer devices 102 comprises an electronic computing device having functionality for splitting or dividing an accounting, such as a restaurant check, between/among two or more customers. The phrases "splitting a check", "check splitting", and "check-splitting function" or "application", as used herein, refers to hardware and/or software for apportioning items purchased by two or more customers between/among the customers who ordered the items. In a restaurant setting, a check splitting function allows food and beverage purchases presented as a consolidated accounting, e.g., a single bill or check, to be apportioned to each customer who purchased the food and/or beverage items respectively. The functionality may be included as an application residing on one or more of the customer devices, or it may reside as a function of another application, such as an electronic menu application. Electronic menus are becoming a popular way for restaurants to offer food and beverage choices to their customers. They additionally allow restaurants to quickly change their menu items and prices, as well as provide a novel and fun way for customers to order food and beverages.

Customer devices 102 typically comprise a tablet computer, such as an Apple iPad, Samsung Galaxy, or any number of tablet computers widely available today. In other embodiments, customer device 102 could comprise a portable computer, smartphone, fixed computer, or wearable device, such as a smartwatch. For example, a customer device 102 may comprise a non-mobile computer with Ethernet capability incorporated into a seating area, such as a table in a restaurant. In addition to the electronic menu, customer devices 102 may offer additional functionality to customers, such as an ability to play games, download or play music, or to purchase goods and services not included on the electronic menu.

In one embodiment, a single customer device 102 is used to split a check between/among two or more people in a group.

In another embodiment, check-splitting functionality is distributed between one or more customer devices 102, local server 110 and/or remote server 14 and/or POS server 104. In this embodiment, food and beverage items on a single check are apportioned between/among people in a group by one or more members of the group, each using a respective customer device 102. As each member assigns food and beverage items to a respective simulated check displayed by each member's customer device 102, the other members' customer devices are updated to reflect the changes made by each of the members by local server 110 or remote server 114. For example, local server 110 or remote server 114 may provide a single accounting of food and beverage items ordered by a group of people sitting at a table to one or more customer devices 102 associated with the table. One or more persons in the group may use a respective customer device 102 to apportion, assign, or attribute the various food and beverage items on the single accounting to each member in the group. As items are assigned to each of the members, signals are transmitted from the customer devices making the assignments to local server 110 or remote server 114, indicative of the apportionments, assignments, or attributions. In response, local server 110 or remote server 114 transmits signals to each customer device, updating them as to the assignments, apportionments, or attributions of the other customer devices.

In one embodiment, a provider of goods or services, such as a restaurant, may provide a customer device 102 to each customer that is seated at a table. For example, a restaurant may provide customer devices 102 to each customer that is seated at a table in the restaurant. In some cases, customers may bring their own customer device 102 in the form of a personal smartphone, tablet computer, laptop computer, etc. In this embodiment, an application for viewing and ordering goods and services may be loaded onto customers' personal computing devices as the customers arrive on the premises, or at a previous time prior to arrival on the premises. Alternatively, or in addition, customers may access a web site offered by the provider to view configurable menus and place orders. In any case, the application that allows customers to view and place orders may also comprise a check-splitting function, or a check-splitting application may be provided as a separate application.

Referring back to FIG. 1, reference is made to an embodiment where a restaurant provides customer devices 102 to each of their customers as they are seated. The customer devices 102 are pre-loaded with a digital menu that also comprises a check-splitting function. Although the following discussion refers to a specific use of system 100 in a restaurant setting, it should be understood that the concepts disclosed herein may be applied to other business settings such as bars, nightclubs, or any other venue where check-splitting may be useful.

Continuing with the example embodiment shown in FIG. 1, a group of three friends arrives at the restaurant and each is given a customer device 102, shown in FIG. 1 as customer devices 102a, 102b, and 102c. The friends are seated at the same table. Each of the friends may use their respective customer device 102 to review food and beverage items available for purchase via a digital menu displayed on each respective customer device. In another embodiment, the friends may use standard menus to review available items and to place orders with a waitperson. The customer devices may allow each friend to place orders directly to a kitchen without the help of a waitperson, for example, by providing wireless signals indicative of menu choices to POS server 104, local server 110, and/or remote server 114 via gateway 116. From there, orders may be routed to kitchen interface 106, such as a video monitor placed inside a kitchen area for cooks to begin preparing the orders. As orders are received by POS server 104, local server 110, and/or remote server 114, a combined accounting is generated by POS server 104, local server 110, and/or remote server 114, indicative of all food and beverage items ordered by a particular group of customers, in this case, the three friends sitting at the table. Orders from the three friends are associated with each other by use of an identification code assigned to each customer device 102. For example, each table in a restaurant may be assigned a unique table identification code, and a table identification code can be provided to each customer device used at a particular table in order to associate orders from those customer devices with a particular group of people.

After the friends have consumed their food and beverage selections, one or more of the friends may invoke a check-out function provided by each respective customer device 102. For example, the digitized menu application may allow the friends to view a single, electronic check containing all of the friends' food and beverage orders, and may also include tax. The check-out function may additionally comprise a check-splitting function, and further, a function that allows each friend to pay for their own food and beverage selections directly via their respective customer device 102, rather than provide payment to a waitperson. It is contemplated that each friend may make payment in one of a variety of ways, such as by entering credit, debit, and/or gift card information into customer device 102, by swiping a credit, debit and/or gift card through a card reader as part of customer device 102, or by providing cash or credit, debit, gift card to a waitperson.

In this example, one of the friends uses his or her customer device 102a to invoke the check-out function by touching a designated icon displayed on customer device 102a. In response, the check-out function displays each food and beverage item that was ordered by all three friends, including the cost of each item, on a single, consolidated check, as well as a blank, simulated individual check each associated with one of the three friends. The person who invoked the check-out feature may now select individual food and beverage items on the consolidated check and assign them each to one of the simulated individual checks. In another embodiment, the other two friends who did not invoke the check-out process may also assign food and beverage items on the consolidated check to the individual, simulated checks. The food and beverage items are assigned from the consolidated check to the individual checks until no more food or beverage items are on the consolidated check, meaning that all of the food and beverage items have been assigned among the three friends.

Each respective customer device 102 may display the consolidated check as well as all three simulated individual checks as food and beverage items are being assigned. After assignment of all food and beverage items is complete, each friend may pay for their own check, either by providing payment to a waitperson, or via a payment application available on the customer device 102. Further details of this process is explained below with reference to one embodiment of a method for splitting checks, shown in the flowchart of FIG.

Figure 2:
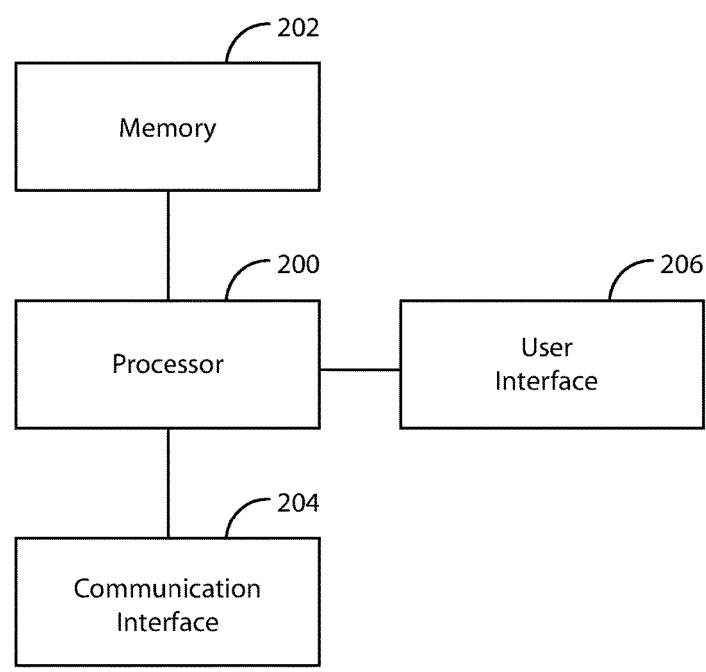
FIG. 2 is a functional block diagram of one embodiment of one a server representative of the local, remote, or POS server shown in FIG. 1.

FIG. 2 is a functional block diagram of one embodiment of local server 110, remote server 114, or POS server 104. Specifically, FIG. 2 shows processor 200, memory 202, communication interface 204, and user interface 206. It should be understood that not all of the functional blocks shown in FIG. 2 are required for operation of server 104 (for example, user interface may not be necessary), that the functional blocks may be connected to one another in a variety of ways, and that not all functional blocks necessary for operation of server 104 are shown (such as a power supply), for purposes of clarity.

Local server 110, remote server 114, or POS server 104 each may comprise virtually any commercially-available servers on the market today, including the P4300IP server system manufactured by Intel Corporation of Santa Clara, Calif. Processor 200 provides general operation of any of the servers by executing processor-executable instructions stored in memory 202, for example, executable code. Processor 200 typically comprises a general purpose processor, such as any of the Xenon® family of processors manufactured by Intel Corporation of Santa Clara, Calif., although any one of a variety of microprocessors, microcomputers, and/or microcontrollers may be used alternatively.

Memory 202 comprises one or more information storage devices, such as hard drives, RAM memories, ROM memories, flash memories, and/or virtually any other type of electronic, optical, or mechanical memory device. Typically, memory 202 comprises more than one type of memory. For example, memory 202 may comprise a ROM memory used to store processor-executable instructions for operation of server 104, plus RAM memory to store customer account information.

Communication interface 204 is electronically coupled to processor 200 and comprises electronic circuitry necessary for any of the servers to communicate with other servers and/or to gateway 116. Gateway 116 is typically a wireless router/modem, used to enable communications among customer devices 102 and remote server 114 via wide-area network 112 (such as the Internet), and for remote server 114 to communicate with customer devices 102 and other servers. Typically, communication interface 204 comprises hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support other well-known communication types, including Wi-Fi, Bluetooth, wireless telephone communications, fiber-optic communications, and so on.

User interface 206 is coupled to processor 200 and is used to allow an individual to control operation a server and/or to receive information from a server. User interface 206 may comprise one or more pushbuttons, switches, sensors, keypads, keyboards, touchscreens, and/or microphones that generate electronic signals for use by processor 200 upon initiation by a user. User interface 206 may additionally comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of information to a user. Of course, the aforementioned items could be used alone or in combination with each other and other devices may be alternatively, or additionally, used.

Figure 3:
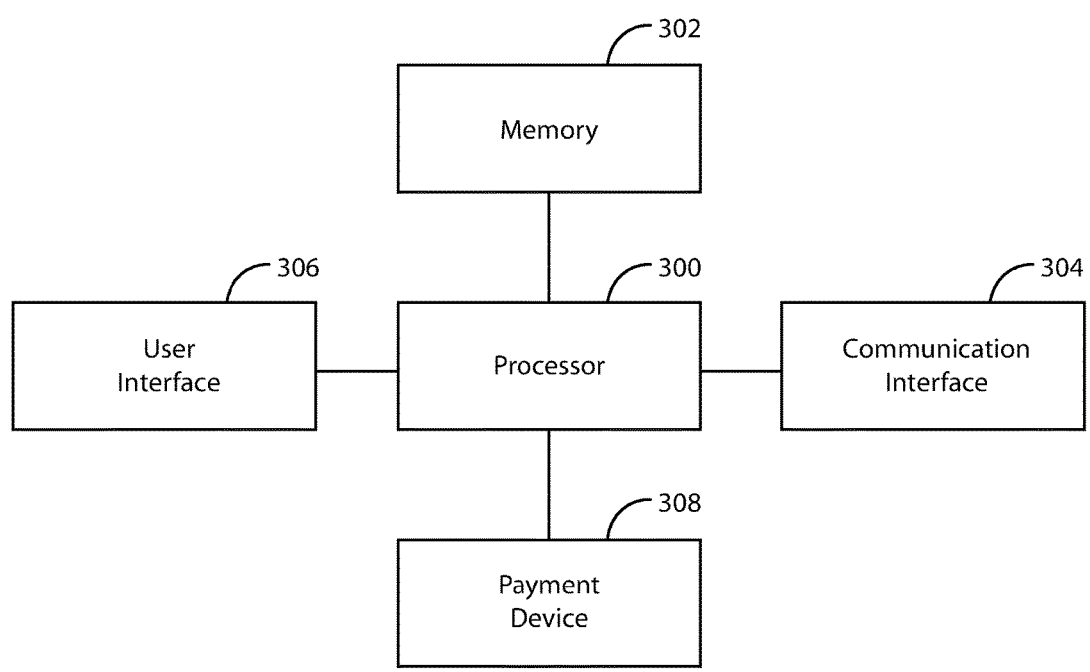
FIG. 3 is a functional block diagram of one embodiment of a customer device as shown in FIG. 1.
Figure 4A:
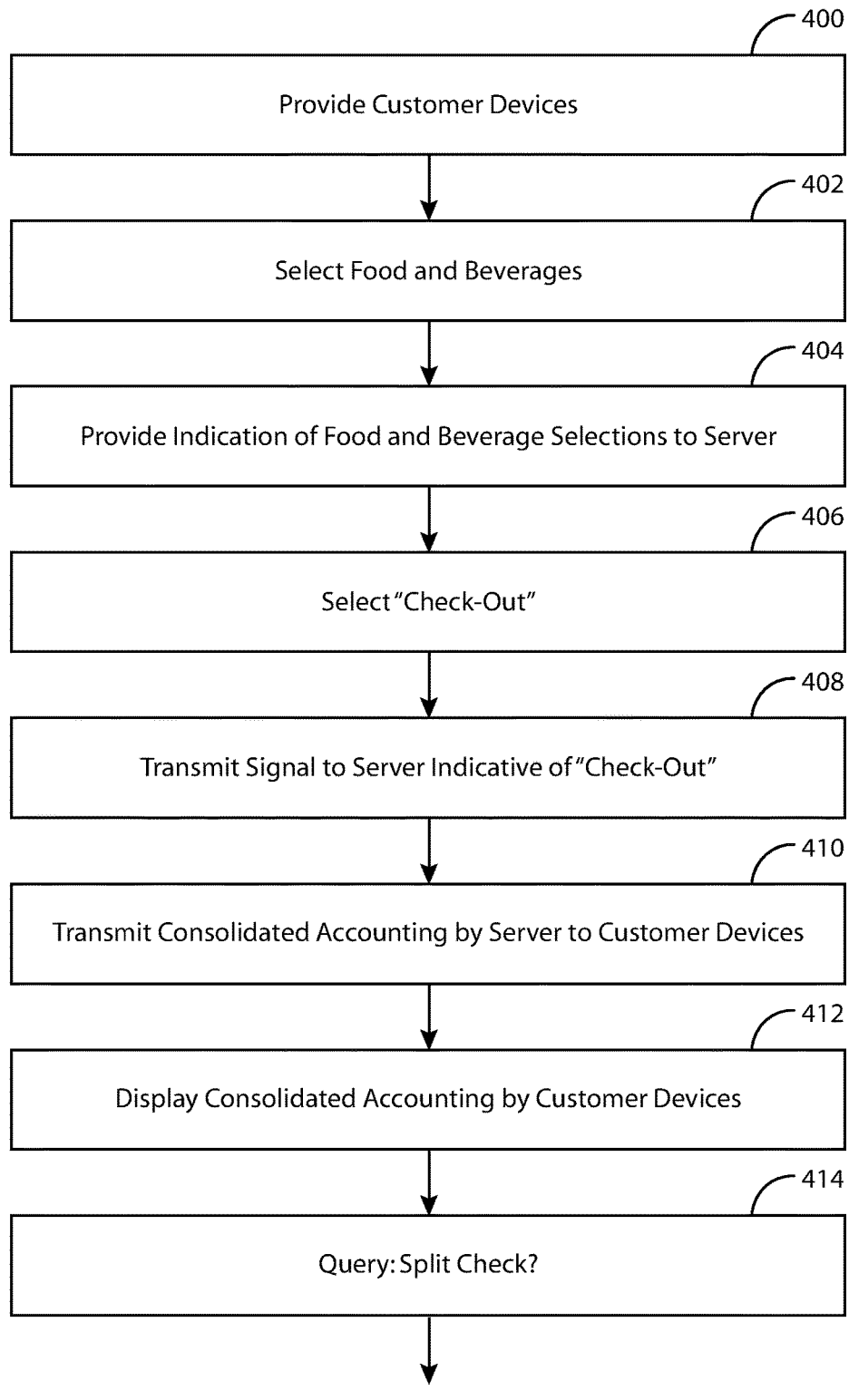
FIG. 4 is a flow diagram illustrating one embodiment for splitting a check between/among two or more people performed primarily by the customer device shown in FIG. 1.
Figure 4B:
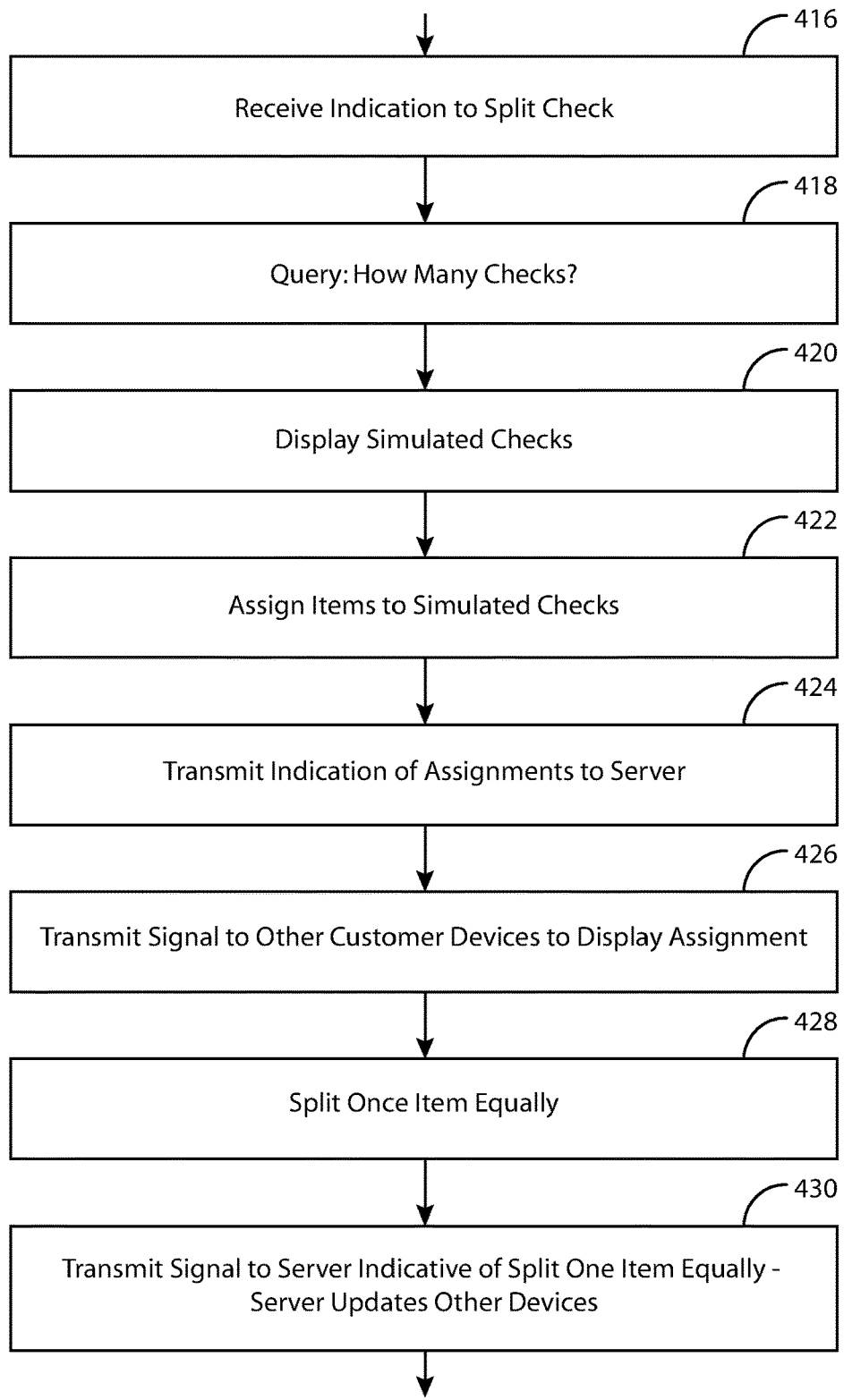
Figure 4C:
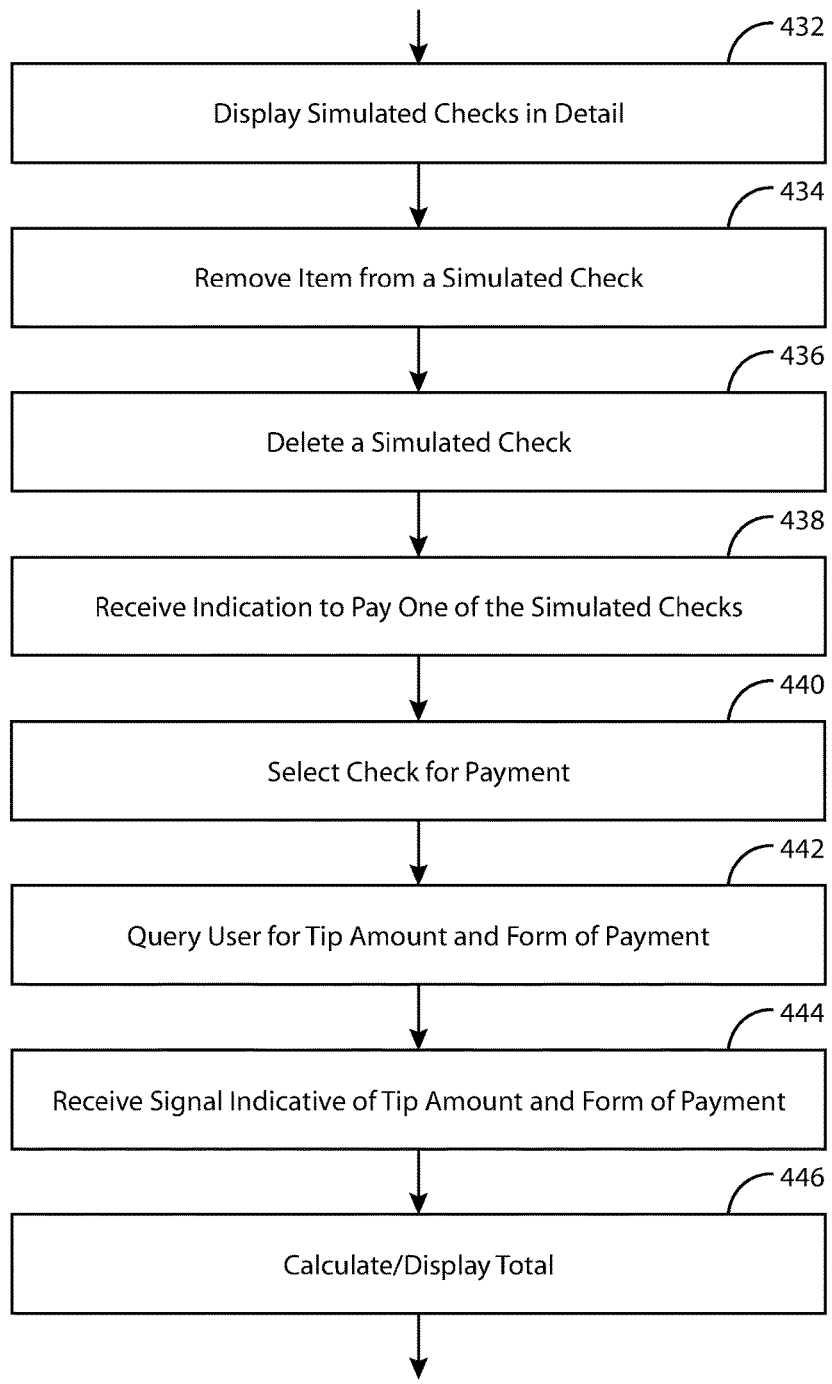
Figure 4D:
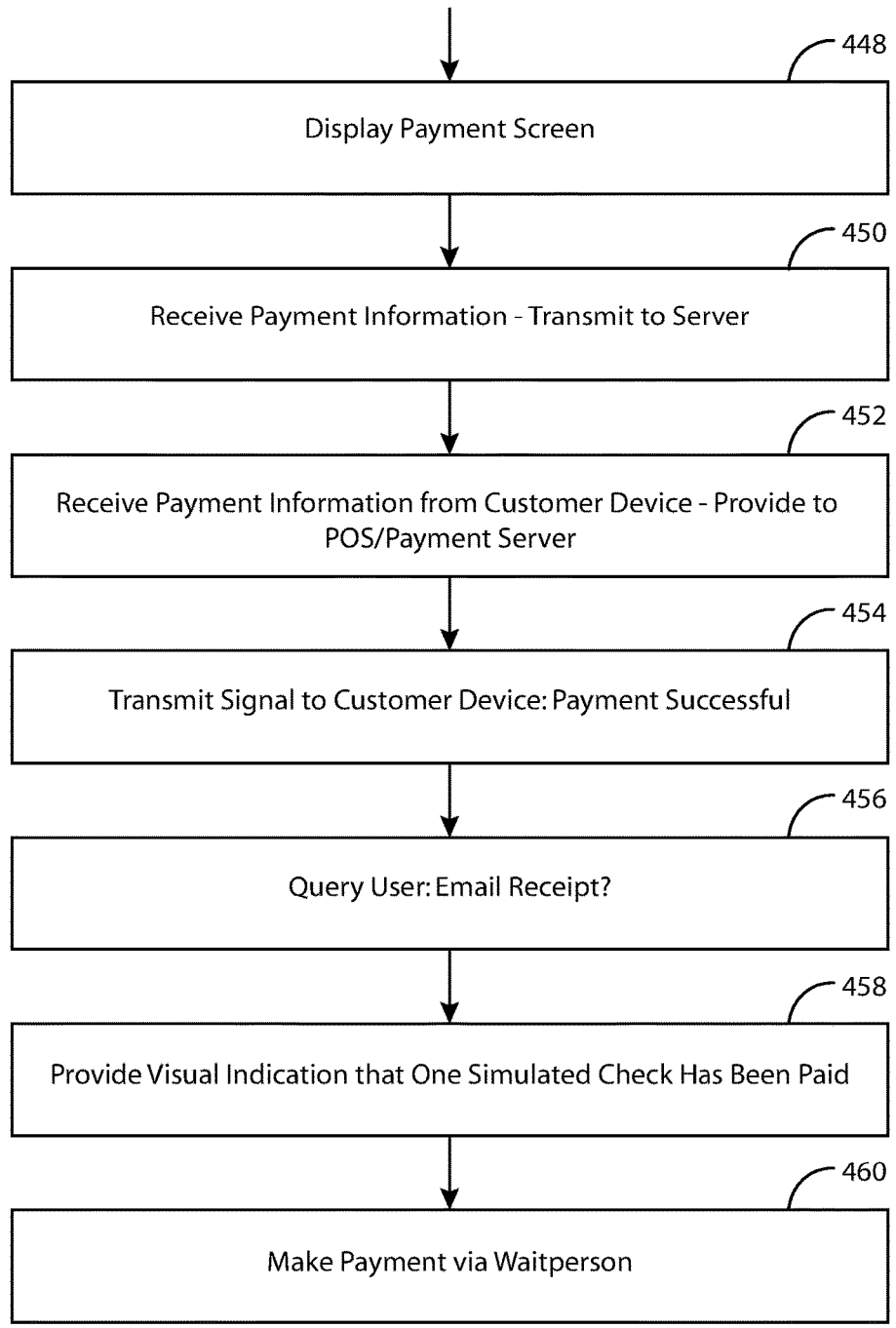

FIG. 3 is a functional block diagram of one embodiment of a customer device 102. Specifically, FIG. 3 shows processor 300, memory 302, communication interface 304, user interface 306, and optional payment device 308. It should be understood that the functional blocks may be connected to one another in a variety of ways and that not all functional blocks necessary for operation of customer device 102 are shown (such as a power supply), for purposes of clarity.

Customer device 102 may comprise virtually any commercially-available portable or fixed computer on the market today having communications capabilities. In a typical embodiment, customer device 102 comprises a tablet computer, such as a Galaxy Tab 10.1 tablet computer manufactured by Samsung Electronics of Seoul, Korea. Processor 300 provides general operation of customer device 102 by executing processor-executable instructions stored in memory 302, for example, executable code. Processor 300 typically comprises a general purpose processor, such as Tegra 2 processor manufactured by Nvidia Corporation of Santa Clara, Calif., although any one of a variety of microprocessors, microcomputers, and/or microcontrollers may be used alternatively.

Memory 302 comprises one or more information storage devices, such as hard drives, RAM memories, ROM memories, flash memories, and/or virtually any other type of electronic, optical, or mechanical memory device. Typically, memory 302 comprises more than one type of memory. For example, memory 302 may comprise a ROM memory used to store processor-executable instructions for operation of customer device 102, plus RAM memory to store one or more digitized choice sets.

Communication interface 304 is electronically coupled to processor 300 and comprises electronic circuitry necessary for customer device 102 to communicate with server 104. Typically, communication interface comprises hardware, software and/or firmware necessary to transmit and receive information sent via one or more commonly-used network protocols, such as the well-known TCP/IP suite of protocols. Alternatively, or in addition, communication interface could comprise electronics and supporting software/firmware to support a variety of well-known communication types, including Ethernet, Wi-Fi, Bluetooth, fiber-optic communications, and so on.

User interface 306 is coupled to processor 300 and is used to allow customers to view one or more digitized choice sets received from server 104 via communication interface 304 and to place orders based on the choice sets. User interface 306 may comprise one or more touchscreens, pushbuttons, switches, sensors, keypads, and/or microphones that generate electronic signals for use by processor 300 upon initiation by customers. User interface 306 may additionally comprise one or more liquid crystal displays (LCDs), one or more light emitting diode displays (LEDDs), one or more light emitting diodes (LEDs), light arrays, or any other type of visual display. Further, user interface 406 could, alternatively or in addition, comprise an audio device, such as a speaker, for audible presentation of information to customers. Of course, the aforementioned items could be used alone or in combination with each other and other devices may be alternatively, or additionally, used. Typically, input device 306 comprises a widely-known touchscreen device capable of displaying information and receiving customer input.

Payment device 308 allows users to pay their individual checks via customer device 102. Payment device 308 may comprise a card reader, a camera, an RFID reader, a physical keypad, a virtual keypad displayed by user interface 306, or other device used to receive payment information from users.

FIG. 4 is a flow diagram illustrating one embodiment for splitting a check between/among two or more people performed primarily by customer device 102. Processor 200 within server 104 executes processor-executable instructions stored in memory 202 that causes the server 104 to perform certain steps, while processor 300 within customer device 102 executes processor-executable instructions stored in memory 302 that causes customer device 102 to perform some of the other steps of the method. It should be understood that in some embodiments, not all of the steps shown in FIG. 4 are performed, and that the order in which the steps are carried out may be different in other embodiments. It should be further understood that some minor method steps may have been omitted for purposes of simplifying the description.

The embodiment discussed with reference to FIG. 4 provides an example where three friends meet for dinner at a restaurant and order food and beverage items from a digital menu displayed on a customer device 102 provided to each friend by the restaurant. In this example, a single check, or accounting, is generated for each table at the restaurant, unless customers request separate checks. In that case, a waitperson creates separate checks for each customer as orders are taken. In other embodiments, customer devices 102 are shared between or among two or more restaurant customers, for example by providing one customer device 102 to each table. It should be further understood that the concepts described with respect to FIG. 4 could be used in other venues, such as bars, nightclubs, or any other venue where consolidated checks are used.

At block 400, in one embodiment, each of the three friends is provided with a customer device 102 by the restaurant, each of the customer devices 102 comprises an application for displaying an electronic menu for viewing and ordering food and beverage items offered by the restaurant. In this embodiment, the application comprises a function that allows customers to view menu items, split checks, as well as accept payment.

At block 402, each of the three customers order food and beverage items from the digitized menu by selecting menu items using a touchscreen display that forms part of user interface 306.

At block 404, each of the customer devices transmits an indication of the food and beverage items selected by each respective customer to POS server 104, server 110 or, remote server 114, depending on implementation by the restaurant. For example, some restaurants may have a local server 110 for communicating with customer devices and POS server 104. Others may not have such a server on the premises but rather rely on remote server 114, which may be owned and operated by a third party under contract with restaurants. When orders are received by POS server 104, local server 110 or remote server 114, an indication of each order may be provided to kitchen interface 106 and/or to waitperson terminal 108 so that their orders may be prepared by kitchen personnel and drinks and other incidentals delivered by an assigned waitperson. Each order transmitted to local server 110 or remote server 114 generally comprises an identification code indicative of a group of people dining in the restaurant, in order to associate a group of people together for purposes of generating a common check that includes all food and beverage items ordered by the group. In some embodiments, the identification code represents physical tables in the restaurant. In other embodiments, a group of customers may decide on an identification code, such as one of the customers' last name, as an identification code, then each customer enters the chosen identification code into each customer device 102 for inclusion in subsequent order transmissions. In general, each time that a customer device 102 transmits a signal to local server 110 or remote server 114, the identification code is transmitted along with it in order to associate the order with orders received from others in the group. Local server 110 or remote server 114 may track orders from each table in the restaurant as they are received in order to combine the orders into a single, consolidated total, which generally includes applicable sales tax. In some embodiments, orders are passed onto POS server 104, for POS server 104 to create an account related to the single accounting that was established by local server 110 or remote server 114 and associated with the identification code. In another embodiment, the consolidated total is provided to POS server 104 after a tip is added to one or more of the friend's individual, simulated checks, as described below.

In another embodiment, an initial order is taken by a live waitperson using waitperson interface 108. Waitperson 108 may comprise a fixed or a mobile computing device for entering customer orders and providing the orders to local server 110, remote server 114, and/or POS server 104. In one embodiment, waitperson interface 108 comprises a mobile device similar in processing capabilities as customer devices 102, but configured for taking orders from customers, then transmitting the orders wirelessly to local server 110, remote server 114 and/or POS server 104, in order for one or more of these servers to generate a consolidated accounting for each table. In this embodiment, waitperson interface 108 transmits an identification code that is pre-assigned to each table along with orders as they are transmitted to one or more of the servers.

Figure 5:
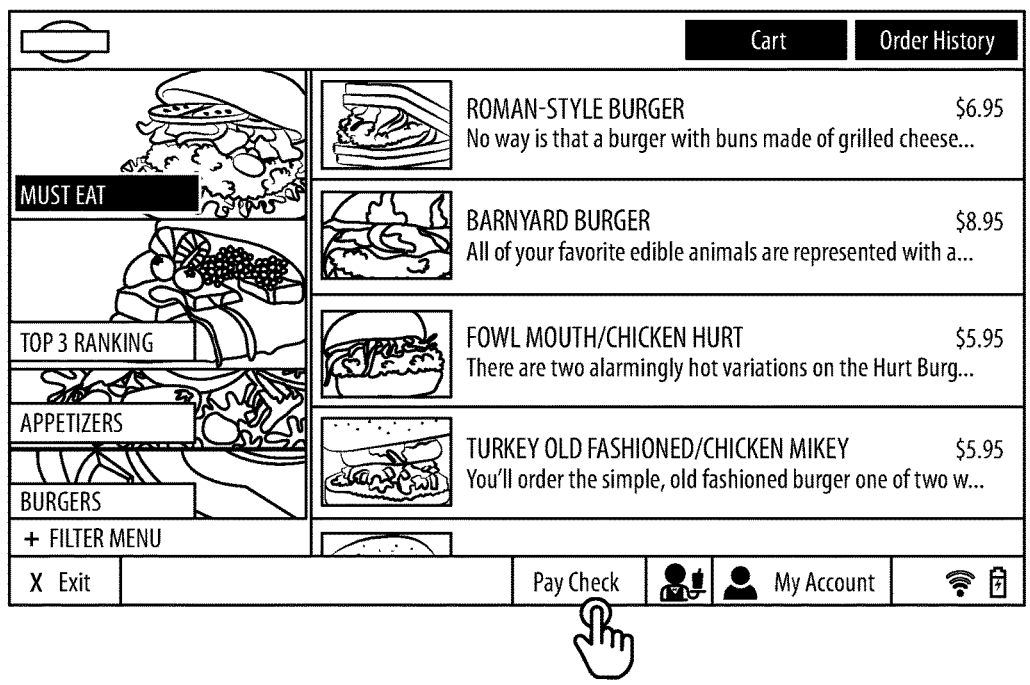
FIG. 5 is a screen shot of a "Check-Out" feature shown on the customer device in FIG. 1.

At block 406, after the three friends have finished their meals, one of the three friends may decide to begin a check-out process using his or her customer device 102 by selecting a "Check-Out" icon or other indication displayed on user interface 306, as shown in FIG. 5. An indication that the group wishes to check out is received by processor 300.

At block 408, processor 300 causes a signal to be transmitted to local server 110 or remote server 114, indicating that the three friends would like to check out.

At block 410, local server 110 or remote server 114 transmits a final combined accounting (otherwise referred to herein as a consolidated accounting or a single accounting), or electronic check, to each of the customer devices 102 assigned to each of the three friends. In another embodiment, the final combined accounting is transmitted only to the customer device 102 who transmitted the request for check out.

At block 412, the consolidated accounting may be displayed to one or all of the friends via their respective customer devices.

Figure 6:
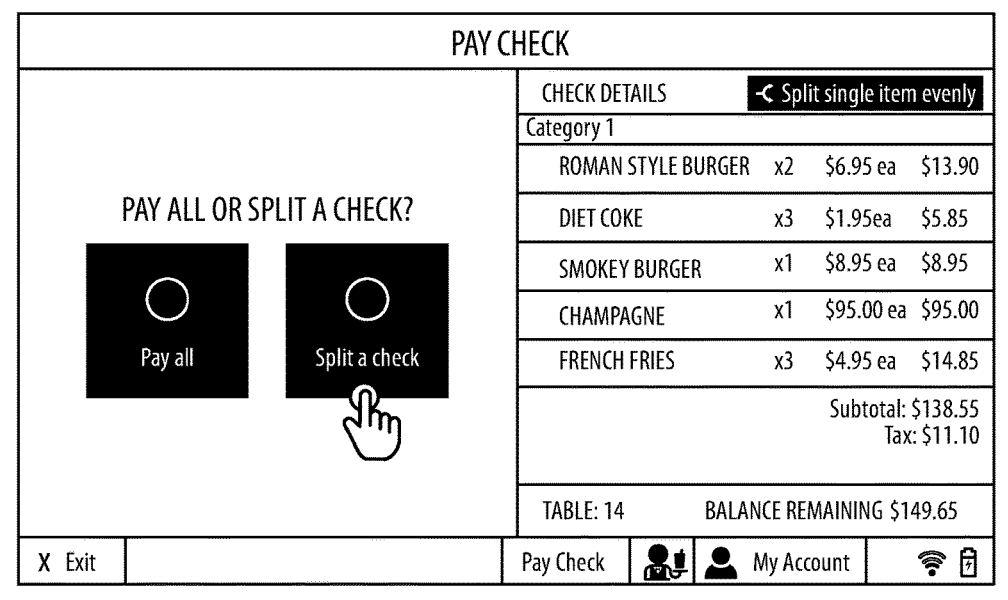

At block 414, processor 300 in one or all consumer devices 102 causes each respective user interface 306 to provide a query to one or more of the friends, to determine whether the friends wish to split the combined accounting, as shown in FIG. 6. In one embodiment, two choices are presented to each of the friends: a "Pay All" icon and a "Split Check" icon. The Pay All icon is selected when the friends do not wish to split the check, for example when one of the friends wants to pay for the other two friends' meals. The Split Check icon is selected when the friends wish to split the check among them.

At block 416, processor 300 receives the selection from one of the friends at block 414 indicating that the friends wish to split the check.

Figure 7:
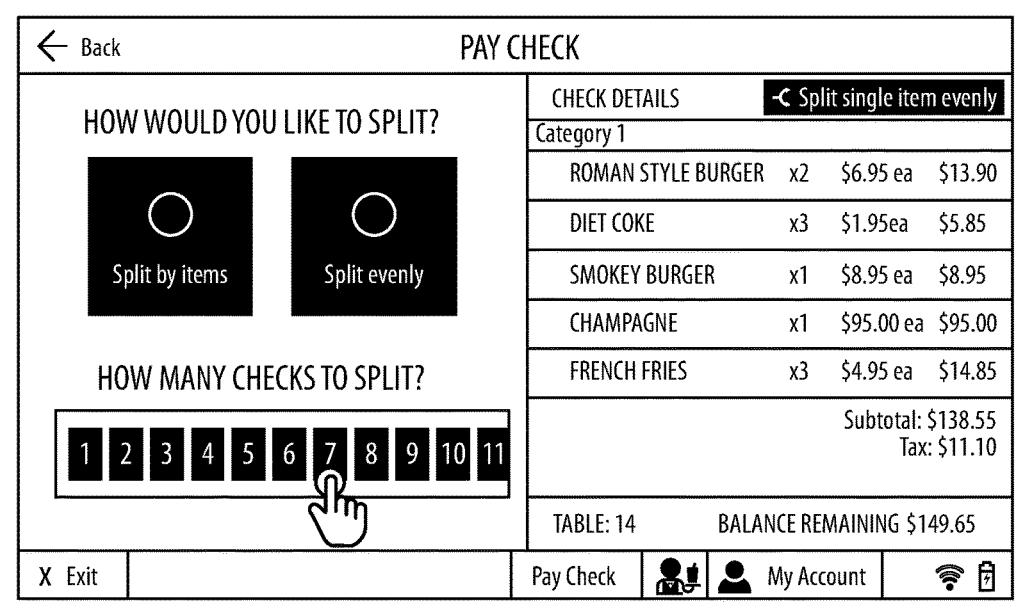

At block 418, processor 300 causes user interface 306 to display another query regarding how many individual checks to create, i.e., how many people desire a separate check. In this example, each of the friends intends to pay for their food and beverage purchases separately. One of the friends enters "3" into his or her customer device 102 using user interface 306, as shown in FIG. 7.

At block 420, in this example, in response to receiving the number of checks to be created, processor 300 displays, in this example, three blank, simulated checks on user interface 306 in a column on the left, and the final combined accounting from local server 110 or remote server 114 on the right, as shown in FIG. 8. Of course, the blank, simulated checks and the consolidated accounting can be displayed on user interface 306 in other arrangements with each other in other embodiments. Each of the blank, simulated checks are associated with one of the three friends, and may be identified by a unique identifier, shown as identifiers 800, 802, and 804, such as a color, number, letter, alpha-numeric code, logo, icon, photograph, or some other visual market that distinguishes each of the checks from the others.

In another embodiment, additionally or alternatively to the above, processor 300 causes transmission of a signal to local server 110 or remote server 114 indicative of the group's desire to split the final combined accounting, and the number of individual checks required. In response, processor 200 at local server 110 or remote server 114 may cause a signal to be sent to POS server 104, indicative that the single accounting will be paid for by three people.

At block 422, one or more of the friends may apportion, assign, or attribute purchased menu items from the final combined accounting to the blank, simulated checks displayed on user interface 306. In the embodiment shown in FIGS. 8, 9, and 10, one or more of the friends use a "drag and drop" technique to assign food and beverage items from the final combined accounting on the right to the blank, simulated checks on the left. FIG. 8 shows the three blank checks on the left and the consolidated accounting from POS server 104 on the right. The checks are labeled "Guest 1", "Guest 2", and "Guest 3" and each assigned a particular identifier: Guest 1 is assigned a red identifier 900, Guest 2 a green identifier 902, and Guest 3 a blue identifier 904. The final combined accounting shows each item that was ordered, the quantity of items that were ordered, each item's unit price, and a total price.

FIG. 9 shows one of the friends moving the "Smokey Burger" from the final combined accounting on the right to one of the blank checks by touching the Smokey Burger label on the left and dragging and dropping a copy of it to one of the blank checks. In other embodiments, assignment of menu items may be accomplished in other ways, such as touching a menu item on the left and then touching a blank check, which assigns that menu item to the check, or by the use of drop-down menus. As used herein, "dragging and dropping" may mean either copying a menu item from the accounting to one of the checks or moving the menu item from the accounting to one of the checks, e.g., deleting the menu item from the final combined accounting.

At block 424, processor 300 receives an indication of the item assignment as one of the friends assigns a menu item from the combined accounting to one of the simulated checks. In response, processor 300 may transmit a signal to local server 110 or remote server 114 indicative of the assignment so that local server 110 or remote server 114 may update the other two customer devices of the change. Either one of the servers receives the signal and with it, the identification code that associates the three customer devices together. Then, one of the servers updates the other two customer devices with the assignment information from the first customer device using the identification code to identify which customer devices should receive the updated information. Processor 300 also causes user interface 306 to alter the single accounting and one of the three simulated checks in accordance with the user's assignment. FIG. 10 shows the display of user interface 306 after the Smokey Burger has been assigned to Guest 2. The Guest 2 simulated check now displays the price of the Smokey Burger plus tax. In another embodiment, the name of the item is also displayed. On the right side of the display, the consolidated accounting has been modified to reflect that the Smokey Burger has been assigned to one of the checks on the right. In this example, the quantity has been reduced by 1 to now display zero, and the total cost has been changed from $8.95 to zero. The subtotal, tax, and remaining balance has also been adjusted to reflect assignment of the Smokey Burger. In addition, in this embodiment, the identifier 802 is displayed in association with the item on the right, indicating that the item has been assigned to Guest 2. If more than one item has been assigned to two or more of the friends, a unique indicator of each check is displayed in association with the item. This process is repeated until all of the food and beverage items on the right have been assigned to one of the three checks on the left, in accordance with what each friend had ordered. As each item is assigned, the amount of the check that receives each item is adjusted to reflect a running total cost of all food and beverage items ordered. For example, if Guest 2 ordered one order of French fries, one of the friends could drag the French fry item on the right to the Guest 2 check, and the total would change from $8.95 to $13.90. In another embodiment, the item name "French fry" would also be shown on the Guest 2 check.

In another embodiment, once an item has been completely assigned to a check (e.g., if an item was ordered by two people, after the second instance has been assigned), it is removed from being displayed on the consolidated accounting on the right side of the display. Thus, when no more items are displayed on the consolidated accounting, the friends know that all of the food and beverage items have been assigned.

At block 426, processor 200 receives the signal from the customer device that transmitted the signal, and in response, transmits a signal to the other customer devices associated with the customer device that transmitted the signal to update the other customer devices with the assignment information received from the customer device that transmitted the signal. In other words, if customer device 102*a* assigned an item from the consolidated accounting to one of the simulated checks, processor 200 causes a signal to be transmitted to customer device 102*b* and 102*c* indicative of the assignment that occurred on customer device 102*a*. In response, processor 300 in each customer device 102*b* and 102*c* alters the display to remove the item from the consolidated accounting and show it on the simulated check chosen by the friend operating customer device 102*a*. In other words, as each item is assigned from the consolidated accounting to the simulated checks by one customer device, the other customer devices associated with the customer device are synced to display the same view as shown on the customer device that made the assignment.

Figure 11:
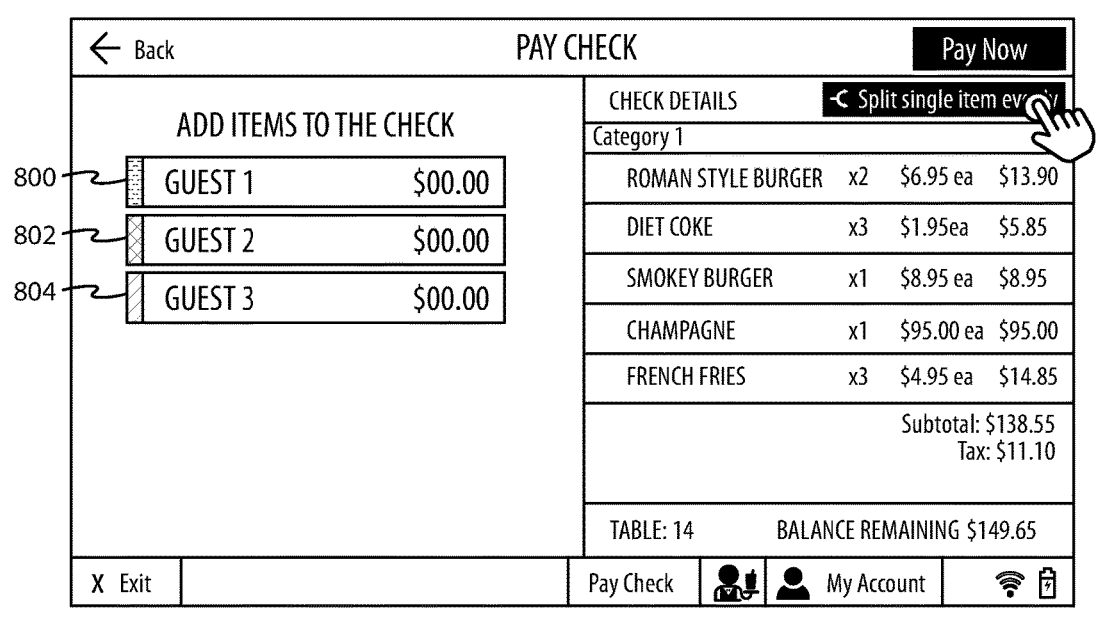

At block 428, any item may be split equally among the friends, as shown in FIGS. 11-13. For example, the friends may agree to split the cost of the Champagne that was enjoyed by all three friends. In that case, one of the friends selects the Champagne item on the right by simply touching the display of his or her customer device to highlight the item, then touches the "Spit Single Item Evenly" icon. In other embodiments, the selection may be carried out slightly differently. For example, the "Split Single Item Evenly" icon may be selected first, followed by a selection of one of the items in the consolidated accounting. In any case, processor 300 receives the information to split the Champagne evenly among the three checks from user interface 306, divides the cost of the item by three, adds the divided amount (or quotient) to each of the checks, adds tax to each check, and displays the new amount for each check. In one embodiment, the unique identifier of each of the checks is displayed in association with the Champagne item on the right to signify that an item has been split evenly among the friends.

At block 430, processor 300 may cause a signal to be transmitted to local server 110 or remote server 114 indicative of the split. In response, processor 200 transmits a signal to the other customer devices associated with the customer device that transmitted the signal in block 426, in order to synchronize each customer device to reflect that the Champagne was split among the three friends.

Figure 14:
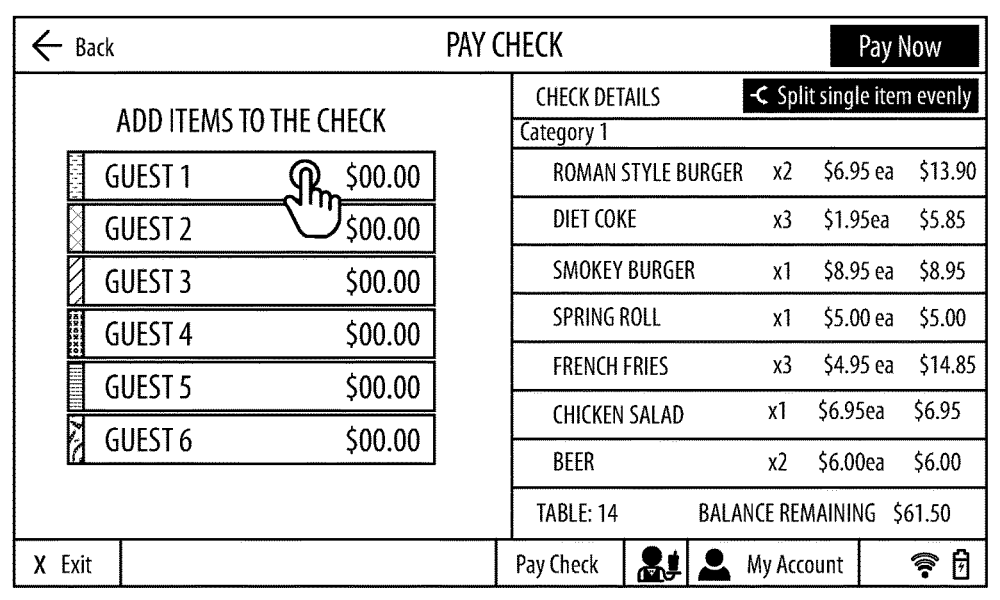
Figure 15:
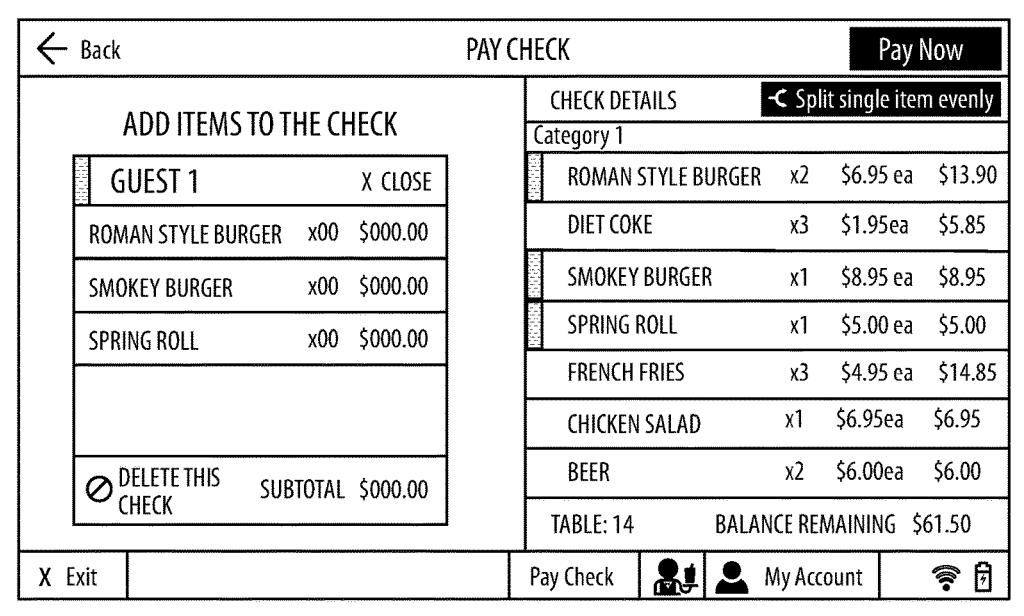

At block 432, after each item in the final combined accounting has been assigned to one or more of the three simulated checks, each friend may review his or her own simulated check, or others' checks, in detail, as shown in FIGS. 14 and 15. FIGS. 14 and 15 show a different number of simulated checks and a different consolidated accounting than previously discussed, with pricing omitted, for illustrative purposes. For example, by selecting one of the checks on the left side of the display, processor 300 expands the selected check so that only the selected check is shown on the left side of the display, as shown in FIG. 15.

Figure 16:
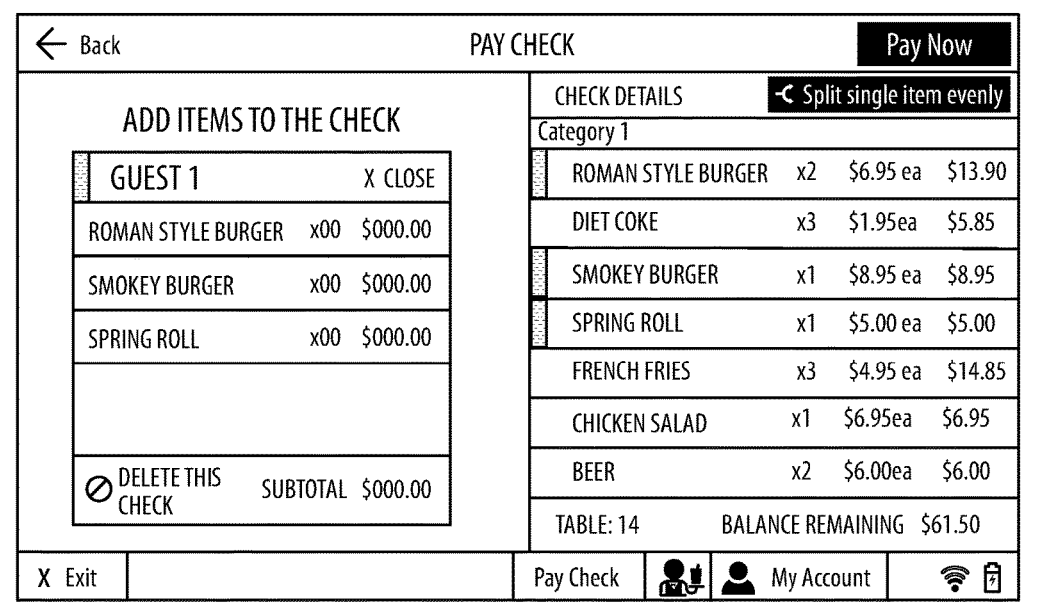

At block 434, if a change is desired for one of the simulated checks, for example one or more items were erroneously assigned to one of the simulated checks, the mistaken item may be removed from the simulated check and be placed back to the consolidated accounting on the right side of the display for assignment to another simulated check. This process is shown in FIGS. 16-18 which show a different number of simulated checks and a different consolidated accounting than previously discussed, with pricing omitted, for illustrative purposes. In one embodiment, as the item is removed from one of the simulated checks, the total reflected by the simulated check is reduced by the unit price of the item, the quantity of the item is incremented by one on the consolidated accounting on the right, and the total of the item in the consolidated accounting is increased by the unit cost of the item by processor 300. In addition, processor 300 causes the unique indicator displayed in association with the item on the consolidated accounting to be removed. The removal of an item and placement back to the consolidated accounting may be accomplished by known techniques, such as dragging and dropping, menu-driven selections, pop-up queries, etc. In another embodiment, in addition or alternatively to processor 300 adjusting the total of the simulated check and other tasks, above, processor 300 transmits a signal to local server 110 or remote server 114 indicative of the item removal. In turn, processor 200 causes a signal to be transmitted to the other customer devices indicative of the item removal.

In another embodiment, items may be transferred from one simulated check to another directly. In this embodiment, a detailed view of one simulated check is presented on the display as well as either a truncated or a full view of one or more of the other simulated checks. One of the friends may then directly assign an item on his or her check to another check directly, by, in one embodiment, dragging and dropping the item from his or her check to one of the other friends' check. As described above, as a result of this process, the totals of each of the affected checks is modified to reflect the removal and addition to the checks, respectively, and the unique identifier modified on the consolidated accounting to reflect the change. Once again, processor 300 may cause a signal to be transmitted to local server 110 or remote server 114 indicative of the re-assignment. In response, processor 200 causes a signal to be transmitted to the other customer devices indicative of this re-assignment.

Figure 20:
FIG. 20 is a screen shot of the customer device in FIG. 1 showing the user deleting one of the simulated checks.

At block 436, one of the checks may be deleted by any one of the friends, as shown in FIGS. 19-21, which show a different number of simulated checks and a different consolidated accounting than previously discussed, with pricing omitted, for illustrative purposes. For example, one of the friends may claim that he forgot his wallet. In this case, one of the friends may select a check for deletion on the left side of the display, then touch a "Delete Check" icon displayed on the display. In response, processor 300 removes the check from being displayed on the left side of the display, re-assigns all of the food and beverage items that was on the deleted check back to the consolidated accounting on the right side of the display, and removes the unique identifiers associated with the deleted check from each of the food and beverage items on the consolidated accounting. In one embodiment, processor 300 transmits a signal to local server 110 or remote server 114 indicative of the deletion. In response, processor 200 in one of these servers causes a signal to be transmitted to the other two customer devices with an update to display only the two remaining simulated checks and the updated view of the combined accounting.

Figure 22:
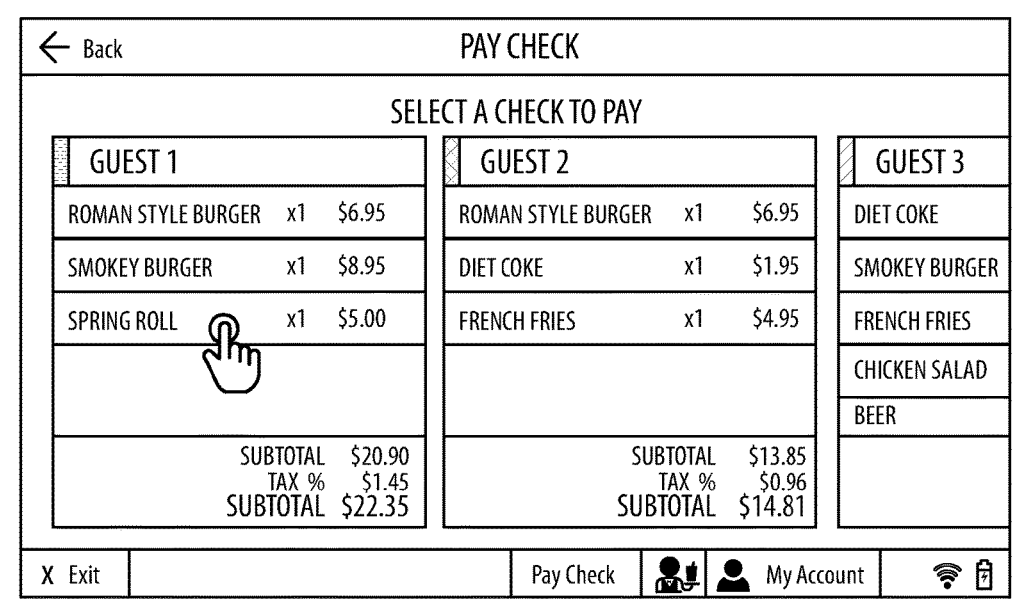

Blocks 438-456 describe a payment process that may be offered by customer devices via the check-splitting application, in one embodiment, shown in FIGS. 22-26. At block 438, one of the friends provides an indication to user interface 306 of a desire to pay at least one of the checks. For example, one of the friends may press a "Pay Now" icon displayed on user interface 306. In another example, one of the checks may be selected by touching user interface 306 where the selected check is displayed. In either case, in response, processor 300 may cause user interface 306 to display a check summary screen, in one embodiment, showing each of the three checks, as shown in FIG. 22. In another embodiment, only one check is displayed in detail, while in another embodiment, one check is displayed in detail and the other checks are shown in a truncated manner, i.e., showing only some of the information of the check, such as an identification of which check it is and a total amount.

At block 440, one of the friends selects one of the checks displayed by user interface 306 by touching user interface 306 where the selected check is shown, or by some other means. An indication of the selection is provided from user interface 306 to processor 300.

Figure 23:
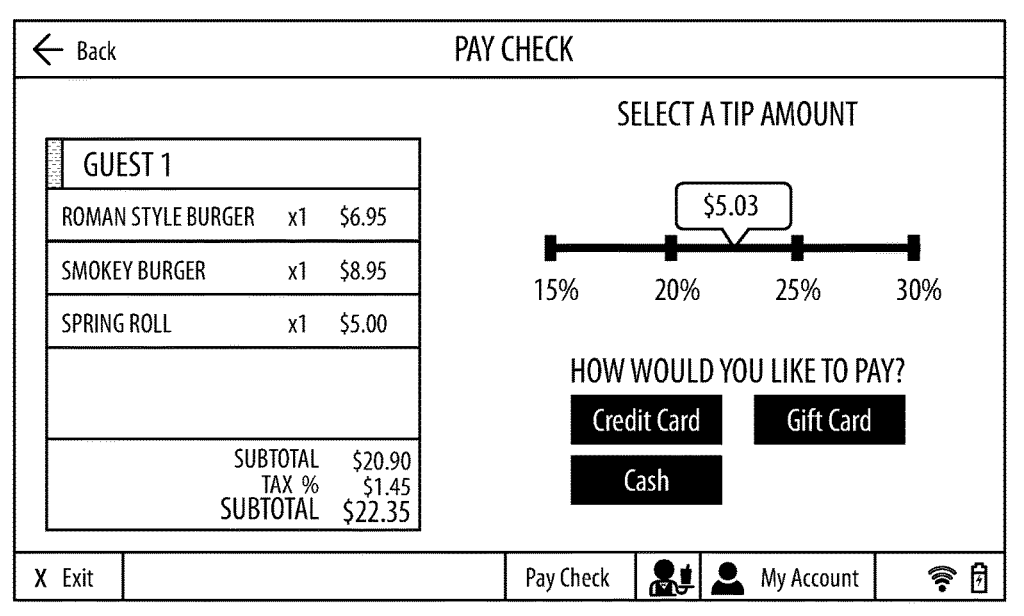

At block 442, in response to receiving the indication of check selection at block 438, processor 300 causes user interface device 306 to display a screen that queries the friend how much of a gratuity, or tip, to give to a waitperson, as shown in FIG. 23. In this embodiment, a sliding bar is displayed on user interface 306 that adds a gratuity as a percentage of the total amount for the check. The screen may also display a selection for the friend to choose a payment method, e.g., cash, credit card, debit card, Paypal, gift card, etc.

At block 444, the friend chooses a tip amount and selects one of the forms of payment, in this example, credit card, by touching user interface 306 accordingly. As a result, signals are provided to processor 300 indicative of the friend's selections. Processor 300 may cause a signal to be transmitted to local server 110 or remote server 114 indicative of the tip amount and the form of payment.

At block 446, processor 300 may calculate the tip and tax associated with the check amount, and the final amount of the check including the tip and the tax. Processor 300 then causes user interface 306 to display this information on the check.

Figure 24:
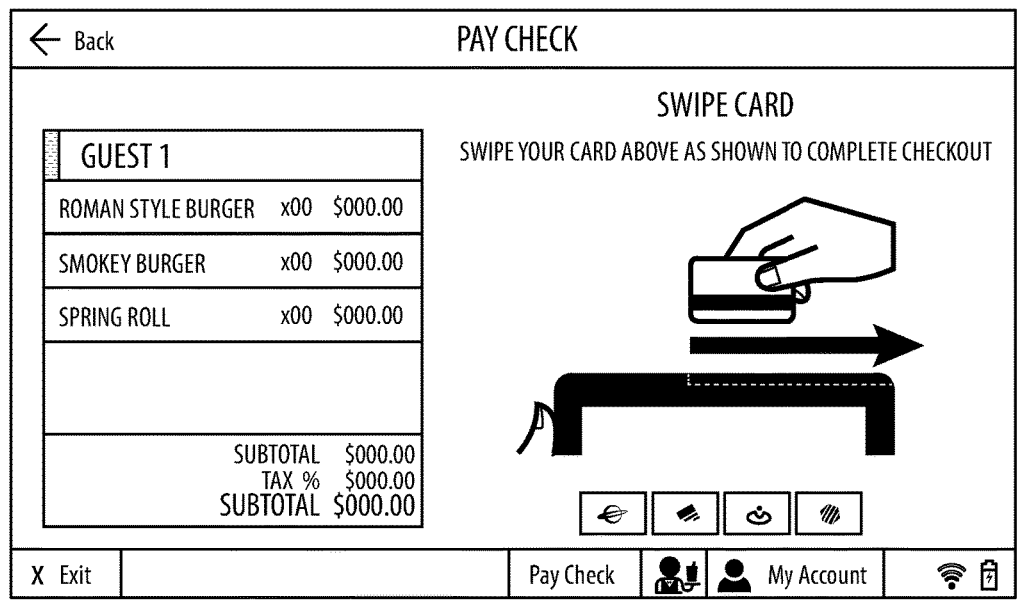
FIG. 24 is a screen shot of the customer device in FIG. 1 showing instructions to swipe a credit card.

At block 448 and shown in FIG. 24, processor 300 causes user interface 306 to display a payment screen for the friend to make payment using, in one embodiment, payment device 308 associated with customer device 102 such as a card reader, a camera, an RFID reader, a physical keypad, a virtual keypad displayed by user interface 306, or other device used to receive payment information from the friend. In another embodiment, the friend simply provides the credit card, debit card, and/or gift card to a waitperson for traditional payment.

At block 450, processor 300 receives the payment information from the payment device and provides the payment information to local server 110 or remote server 114. The payment information generally includes the amount being paid, the amount attributable as a tip, if any, the form of payment, and an account number, such as a credit card number, expiration date, etc.

At block 452, processor 200 receives the payment information from the customer device and provides it to POS server 104 or to payment server 118, depending on whether POS server 104 is configured to process payments, contractual relationships, etc. POS server 104 or payment server 118, in turn, contacts a financial institution associated with the payment (e.g., bank, credit card company) and debits an account associated with the payment information, for example, a credit card account, bank account, Paypal account, etc. POS server 104 may also reduce a balance of the consolidated accounting associated with the table to reflect payment by one of the three friends. POS server 104 may also credit an account associated with a live waitperson who waited on the table of three friends with the tip amount, if included in the payment information. POS server or payment server 118 may then provide a signal to local server 110 or remote server 114 that payment was successful.

At block 454, processor 200 causes a signal to be transmitted to the customer devices, indicating that payment of one of the simulated checks was successful.

Figure 25:
FIG. 25 is a screen shot of the customer device in FIG. 1 querying a person whether the person wants to receive a receipt of the payment by email.

At block 456, processor 300 causes user interface 306 to display a receipt screen asking the friend whether he or she would like to receive a receipt by email, text message, voice message, or some other form of communication. This is shown in FIG. 25. In response, the friend may enter an email address, where it is then sent to local server 110 or remote server 114. In response, local server 110 or remote server 114 sends an email to the friend with a copy of the friend's simulated check using the email address provided by the friend.

At block 458, in one embodiment, processor 300 causes user interface 306 to display the three checks once again, similar to the display at block 436, except that the check that has been paid is visually identified as having been paid. This could be accomplished by processor 300 "greying out" the paid check, by displaying a large "X" across the check, by displaying a large "Paid" across the check, or some other similar manner. This is shown in FIG. 26.

At block 460, one of the remaining friends may choose to pay their check using cash, credit card, debit card, etc. by providing payment directly to the waitperson. The waitperson then provides payment information to POS 104, local server 110, or remote server 114, directly or indirectly via gateway 116, by providing the payment information to one or more of the servers. The waitperson provides payment information using waitperson interface 108 or another terminal dedicated to providing payments to POS server 104 directly, or to local server 110 or remote server 114. Typically, the waitperson enters the identification code associated with the table along with the payment information for POS server 104, local server 110 or remote server 114 to identify a consolidated accounting associated with the identification code. Once POS server 104, local server 110 or remote server 114 receives this information, a financial institution is associated with the form of payment is contacted, or the consolidated accounting is debited by an amount entered by the waitperson, if cash was tendered. The waitperson may also indicate an amount as a tip to POS server 104, local server 110 or remote server 114, and the tip may be credited to an account associated with the waitperson. After POS server 104, local server 110 or remote server 114 has verified payment, a signal may be provided to the customer devices to indicate successful payment, and the amount of the payment, including any amount attributable as a tip.

When all three of the checks have been paid, e.g., when the consolidated accounting balance is reduced to zero, a signal may be provided by POS server 104 to local server 110 or remote server 114 indicating that the consolidated amount has been paid. In response, local server 110 or remote server 114 transmits a signal to each of the customer devices indicating that the consolidated amount has been paid. Processor 300 may cause user interface 306 to display an indication that the consolidated amount has been paid. In another embodiment, local server 110 or remote server 114 polls POS server 104 at scheduled time intervals and/or upon the occurrence of one or more predefined events, to determine when the consolidated accounting balance is zero.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A device for creating separate checks from a single, combined accounting of items purchased by two or more people, comprising:
    a memory for storing processor-executable instructions;
    a user interface for receiving input from a first person and for providing output to the first person;
    a communication interface for transmitting and receiving information to and from a server;
    a processor coupled to the memory, the user interface, and the communication interface, for executing the processor-executable instructions that cause the customer device to:
        receive the single, combined accounting from the server via the communication interface;
        display the single, combined accounting to the first person via the user interface;
        display two or more simulated checks on the display in addition to the single, combined accounting, each simulated check representing an accounting of a person who ordered at least some of the items listed on the single, combined accounting;
        receive input from the first person to assign a first item listed on the single, combined accounting purchased by the first person to a first simulated check of the two or more simulated checks;
        display a price of the first item on the first simulated check via the user interface;
        receive input from the first person to assign a second item listed on the single, combined accounting purchased by a second person to a second simulated check of the two or more simulated checks;
        display a price of the second item on the second simulated check via the user interface;
        display an indication in the single, combined accounting that the first item was assigned to the first simulated check;
        receive an indication from the first person via the user interface to remove the first item from the first simulated check;
        remove the first item from being displayed on the first simulated check; and
        add the price of the first item to the single, combined accounting.

2. The device of claim 1, wherein the processor-executable instructions additionally comprise instructions that cause the device to:
    display items available for purchase via the user interface;
    receive input from the first person of a selection of at least one of the items available for purchase via the user interface; and
    transmit an indication of the selection to the server via the communication interface;
    wherein the single, combined accounting comprises the at least one item.

3. The device of claim 1, wherein the input from the first person to assign the first item to the first simulated check and the second item to the second simulated check comprises:
    dragging and dropping a copy of the first item form the single, combined accounting to the first simulated check; and
    dragging and dropping a copy of the second item form the single, combined accounting to the second simulated check.

4. The device of claim 1, wherein the processor-executable instructions additionally comprise instructions that cause the device to:
    receive an indication from the first person via the user interface to delete the first simulated check;
    add the price of the first item to the single, combined accounting; and
    delete the first simulated check from being displayed on the user interface.

5. The device of claim 1, wherein the processor-executable instructions additionally comprise instructions that cause the device to:
    receive a selection from the first person to divide the price of a third item on the single, combined accounting equally between or among the two or more checks displayed via the user interface;
    divide a price of the third item by a number of simulated checks displayed on the user interface resulting in a quotient; and
    add the quotient to each of the simulated checks displayed on the user interface.

6. The device of claim 5, wherein the processor-executable instructions additionally comprise instructions that cause the device to:
    display an indicator on the third item displayed in the single, combined accounting that the third item was divided equally between or among the simulated checks displayed on the user interface.

7. The device of claim 1, wherein the processor-executable instructions additionally comprise instructions that cause the device to:
    subtract a price of the first item from a total of the single, combined accounting; and
    subtract a price of the second item from the total of the single, combined accounting.

8. A device for creating separate checks from a single, combined accounting of items purchased by two or more people, comprising:
    a memory for storing processor-executable instructions;
    a user interface for receiving input from a first person and for providing output to the first person;
    a communication interface for transmitting and receiving information to and from a server;
    a processor coupled to the memory, the user interface, and the communication interface, for executing the processor-executable instructions that cause the customer device to:
        receive the single, combined accounting from the server via the communication interface;
        display the single, combined accounting to the first person via the user interface;
        display two or more simulated checks on the display in addition to the single, combined accounting, each simulated check representing an accounting of a person who ordered at least some of the items listed on the single, combined accounting;
        receive input from the first person to assign a first item listed on the single, combined accounting purchased by the first person to a first simulated check of the two or more simulated checks;

display a price of the first item on the first simulated check via the user interface;
receive input from the first person to assign a second item listed on the single, combined accounting purchased by a second person to a second simulated check of the two or more simulated checks;
display a price of the second item on the second simulated check via the user interface;
display an indication in the single, combined accounting that the first item was assigned to the first simulated check;
receive an indication from the first person to pay the first simulated check;
receive payment from the first person via the payment device; and
provide an indication to the user interface that the first simulated check has been paid while the second simulated check remains unpaid.

9. The device of claim 1, wherein the processor-executable instructions additionally comprise instructions that cause the device to:
transmit a signal to a server indicative of assigning the first item to the first simulated check;
wherein the server transmits a second signal to the second customer device with instructions to update a second display in accordance with the assignment of the first item to the first simulated check.

10. A server for supporting separate check creation from a single, combined accounting of items purchased by two or more people, comprising:
a memory for storing processor-executable instructions;
a communication interface for transmitting and receiving information to and from a first customer device associated with a first person and a second customer device associated with a second person;
a processor coupled to the memory and the communication interface, for executing the processor-executable instructions that cause the server to:
create the single, combined accounting from orders received from the first customer device and the second customer device;
provide the single, combined accounting to the first customer device upon receipt of a request from the first customer device for display on the first customer device;
receive an indication from the first customer device to assign a menu item in the single, combined accounting to a first simulated check displayed by the first customer device;
transmit a signal to the second customer device indicative of the assignment of the first menu item to the first simulated check;
cause an indication to be displayed in the single, combined accounting that the first item was assigned to the first simulated check;
receive an indication from the first customer device to remove the first item from the first simulated check displayed on the first customer device; and
transmit a signal to the second customer device to remove the first item from the first simulated check.

11. The server of claim 10, wherein the indication from one of the customer devices to assign the first item to the first simulated check comprises an indication that the first person associated with the first customer device dragged and dropped a copy of the first item from the single, combined accounting displayed on a user interface of the first customer device to the first simulated check displayed on the first customer device.

12. The server of claim 10, wherein the processor-executable instructions additionally comprise instructions that cause the server to:
receive an indication from the first customer device to delete the first simulated check; and
transmit a signal to the second customer device for the second customer device to delete the first simulated check.

13. The server of claim 10, wherein the processor-executable instructions additionally comprise instructions that cause the server to:
receive a signal from the first customer device that the price of a first item will be split equally between or among the number of people associated with the single, combined accounting; and
transmit a signal to the second customer device to display an indication on the single, combined accounting that the price of the first item has been divided equally between or among the number of people associated with the single, combined accounting.

14. The device of claim 8, wherein the processor-executable instructions additionally comprise instructions that cause the device to:
transmit a signal to a server indicative of assigning the first item to the first simulated check;
wherein the server transmits a second signal to the second customer device with instructions to update a second display in accordance with the assignment of the first item to the first simulated check.

15. A server for supporting separate check creation from a single, combined accounting of items purchased by two or more people, comprising:
a memory for storing processor-executable instructions;
a communication interface for transmitting and receiving information to and from a first customer device associated with a first person and a second customer device associated with a second person;
a processor coupled to the memory and the communication interface, for executing the processor-executable instructions that cause the server to:
create the single, combined accounting from orders received from the first customer device and the second customer device;
provide the single, combined accounting to the first customer device upon receipt of a request from the first customer device for display on the first customer device;
receive an indication from the first customer device to assign a menu item in the single, combined accounting to a first simulated check displayed by the first customer device;
transmit a signal to the second customer device indicative of the assignment of the first menu item to the first simulated check;
cause an indication to be displayed in the single, combined accounting that the first item was assigned to the first simulated check;
receive payment information from the first customer device for paying the first simulated check;
providing the payment information to a second server for processing the debiting a payment account associated with the payment information; and transmit a signal to the first customer device indicating that the first simulated check has been paid, while the second simulated check has not been paid.

16. The device of claim 8, wherein the processor-executable instructions additionally comprise instructions that cause the device to:
   display items available for purchase via the user interface;
   receive input from the first person of a selection of at least one of the items available for purchase via the user interface; and
   transmit an indication of the selection to the server via the communication interface;
   wherein the single, combined accounting comprises the at least one item.

17. The server of claim 15, wherein the processor-executable instructions additionally comprise instructions that cause the server to:
   receive an indication from the first customer device to delete the first simulated check; and
   transmit a signal to the second customer device for the second customer device to delete the first simulated check.

18. The device of claim 8, wherein the input from the first person to assign the first item to the first simulated check and the second item to the second simulated check comprises:
   dragging and dropping a copy of the first item form the single, combined accounting to the first simulated check; and
   dragging and dropping a copy of the second item form the single, combined accounting to the second simulated check.

19. The device of claim 8, wherein the processor-executable instructions additionally comprise instructions that cause the device to:
   receive a selection from the first person to divide the price of a third item on the single, combined accounting equally between or among the two or more checks displayed via the user interface;
   divide a price of the third item by a number of simulated checks displayed on the user interface resulting in a quotient; and
   add the quotient to each of the simulated checks displayed on the user interface.

20. The device of claim 19, wherein the processor-executable instructions additionally comprise instructions that cause the device to:
   display an indicator on the third item displayed in the single, combined accounting that the third item was divided equally between or among the simulated checks displayed on the user interface.

21. The device of claim 8, wherein the processor-executable instructions additionally comprise instructions that cause the device to:
   subtract a price of the first item from a total of the single, combined accounting; and
   subtract a price of the second item from the total of the single, combined accounting.

* * * * *